US006748427B2

(12) United States Patent
Drosset et al.

(10) Patent No.: US 6,748,427 B2
(45) **Date of Patent: *Jun. 8, 2004**

(54) SYSTEM AND METHOD FOR PROVIDING MEASUREMENT OF TRACKING EVENTS WITH RADIO BROADCAST MATERIALS VIA THE INTERNET

(75) Inventors: Joseph Drosset, Naperville, IL (US); Jeffrey A. Hanrahan, Orland Park, IL (US); Louis J. Keeble, Dyer, IN (US); Edwin C. Price, Chicago, IL (US); Gregory B. Mackintosh, Roselle, IL (US)

(73) Assignee: Susquehanna, Media Co., York, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/040,987

(22) Filed: Jan. 7, 2002

(65) Prior Publication Data

US 2002/0188746 A1 Dec. 12, 2002

Related U.S. Application Data

(63) Continuation of application No. 09/172,064, filed on Oct. 13, 1998, now abandoned.

(51) Int. Cl.[7] .......... G06F 15/16
(52) U.S. Cl. .......... 709/219; 709/218
(58) Field of Search .......... 709/231, 203, 709/217, 219, 224

(56) References Cited

U.S. PATENT DOCUMENTS 5,204,969 A 4/1993 Capps et al. .......... 395/800
5,557,724 A 9/1996 Sampat et al. .......... 395/157
5,572,442 A 11/1996 Schulhof et al. .......... 364/514
5,699,089 A 12/1997 Murray .......... 345/902
5,734,119 A 3/1998 France et al.
5,774,664 A 6/1998 Hidary et al. .......... 395/200.48
5,778,187 A * 7/1998 Monteiro et al. .......... 709/231
5,822,537 A 10/1998 Katseff et al. .......... 395/200.61

(List continued on next page.)

FOREIGN PATENT DOCUMENTS

EP 0847156 A2 6/1998
WO WO 98/21664 5/1998

(List continued on next page.)

OTHER PUBLICATIONS

Randall E. Stross; "The Microsoft Way :The Real Story of How the Company Outsmarts its Competition" Copyright© 1996, 1997 by Randall E. Stross, Addison–Wesley; Reading, Massachusetts.

*Primary Examiner*—Patrice Winder
*Assistant Examiner*—Philip B. Tran
(74) *Attorney, Agent, or Firm*—Venable LLP; James R. Burdett; Daniel G. Vivarelli, Jr.

(57) ABSTRACT

A broadcast material delivery architecture provides coordinated inclusion of supplemental materials with delivered broadcast material. A broadcaster broadcasts the broadcast materials to a plurality of users, the broadcast material being divided into a plurality of segments. Also broadcast is program data associated with the plurality of segments. A user terminal receives the broadcast material from the broadcaster and retrieving supplemental materials related to said plurality of segments of said broadcast material. To retrieve the supplemental materials, the program data are provided to a data server, which provides parameters for the supplemental materials to the user terminal. The user terminal uses the parameters to retrieve supplemental materials from one or more databases. The user terminal plays the supplemental materials in conjunction with the broadcast material.

34 Claims, 20 Drawing Sheets

U.S. PATENT DOCUMENTS

| | | | | | |
|---|---|---|---|---|---|
| 5,826,102 | A | | 10/1998 | Escobar et al. | 395/806 |
| 5,828,839 | A | * | 10/1998 | Moncreiff | 709/217 |
| 5,918,213 | A | | 6/1999 | Bernard et al. | 705/26 |
| 5,922,047 | A | | 7/1999 | Newlin et al. | 709/217 |
| 5,928,330 | A | | 7/1999 | Geotz et al. | 709/231 |
| 5,931,901 | A | * | 8/1999 | Wolfe et al. | 709/203 |
| 5,963,916 | A | | 10/1999 | Kaplan | 705/26 |
| 6,151,634 | A | * | 11/2000 | Glaser et al. | 709/219 |
| 6,161,142 | A | * | 12/2000 | Wolfe et al. | 709/230 |
| 6,166,735 | A | * | 12/2000 | Dom et al. | 707/103 |
| 6,199,076 | B1 | * | 3/2001 | Logan et al. | 707/501 |
| 6,226,618 | B1 | * | 5/2001 | Downs et al. | 705/1 |

FOREIGN PATENT DOCUMENTS

| | | | |
|---|---|---|---|
| WO | 0 847 156 A2 | 6/1998 | |
| WO | WO 98/26529 | 6/1998 | H04H/15/00 |
| WO | WO 98/26571 | 6/1998 | H04M/15/00 |
| WO | WO 98/31114 | 7/1998 | H04H/9/00 |

* cited by examiner

516

SONG TABLE

| STATION ID | CUT CODE | ALBUM ID | ARTIST NAME | ALBUM NAME | SONG NAME |
|---|---|---|---|---|---|
| ZONE | Q1234 | 0001 | FASTBALL | ALL THE PAIN... | THE WAY |

517

PROVIDER TABLE

| ALBUM ID | IMAGE NAME | PROVIDER LINK | ARTIST NAME | ALBUM NAME | SONG NAME |
|---|---|---|---|---|---|
| 0001 | #?*1! | &%#123 | FASTBALL | ALL THE PAIN... | THE WAY |

FIG. 11

SYSTEM AND METHOD FOR PROVIDING MEASUREMENT OF TRACKING EVENTS WITH RADIO BROADCAST MATERIALS VIA THE INTERNET

This is a continuation, and claims priority to, co-pending U.S. application Ser. No. 09/172,064 to Drosset et al., entitled "System and Method of Audience Measurement", and filed Oct. 13, 1998 now abandoned.

The present application is related to co-pending U. S. patent application Ser. No. 09/163,292, titled "System and Method For Providing Broadcast Material History," now U.S. Pat. No. 6,317,784, 09/163,297, titled "System and Method For Playing Supplemental Materials With Broadcast Material," now abandoned, and No. 09/163,288, titled "System and Method For Coordiating Communications Network Advertising Material," now abandoned, each of which are of common assignee and are incorporated herein by reference in their entirety.

BACKGROUND OF THE INVENTION

1. Field of the Invention

The present invention relates generally to broadcast materials, and more particularly to a system and method for measuring broadcast material audiences.

2. Related Art

Broadcast material providers have historically relied on third-party ratings services to evaluate their listenership and to make programming decisions. However, such ratings services often rely on manual techniques to gather listeners' preferences. According to one such technique commonly used in the radio industry, booklets are distributed to random families intended to represent a cross-section of the listening public. These families are instructed to fill out the booklets according to their actual listening patterns.

Such manual techniques are subject to error and inaccuracy. For example, some listeners may put off filling out the booklet until the end of the week. At the end of the week, they then attempt to recall the programs they actually heard. The accuracy of the reporting then, is subject to the accuracy of the listener's memory. Additionally, there is little that can be done to prevent listeners from purposely skewing the results by intentionally filling out the provided forms inaccurately.

Another disadvantage of these manual techniques is the time delay inherent therein. A station program director may receive his or her station's ratings as much as 90 days after the fact. This delay is undesirable, as program directors cannot see in real time the effects of their programming decisions. Often times, a programming 'mistake' can remain undetected for many months until the program director finally receives the rating results.

SUMMARY OF THE INVENTION

The present invention is directed toward systems and methods for measuring the audience of a broadcast program and for providing audience measurement information to the broadcaster. According to one aspect of the invention, broadcast materials are provided to one or more users from a server via a network. For example, according to one embodiment, the broadcast material is delivered to the user in segments such as, for example, tracks of music, advertisements, and promotional materials in a radio broadcast. In this embodiment, the supplemental materials can be coordinated with the individual segments (e.g., tracks) such that supplemental materials relating to the segments can be provided as the segments are being provided to the user.

Supplemental materials can be provided in a coordinated fashion with the broadcast materials such that they relate to the actual broadcast materials as they are being streamed or otherwise delivered to the user. Supplemental materials can include, for example, images, video clips, audio clips, data, or other materials that may be provided to the user in conjunction with the broadcast materials. The supplemental materials can also include advertising information that is provided to the user during particular segments of the broadcast material.

One example application of this aspect is found in the broadcast of radio broadcast materials over the Internet. According to this example application, the radio broadcast materials can include a plurality of tracks that can be streamed to a user via the Internet. The tracks can include, for example, music tracks, advertising tracks, DJ voice or introduction tracks, promotional tracks, and any other track that a station my wish to broadcast as part of its broadcast material. In one embodiment, the tracks are provided along with program data that can indicate, for example, an identification of the track, the type of track, and other pertinent or relevant information regarding the particular track being broadcast at that time. In one embodiment, the program data can include, for example, a cut code. This information can be provided to an Internet broadcast service provider that "broadcasts" the broadcast materials and the program data to the listener's Internet terminal.

The listener receives the broadcast material and the program data via the Internet connection and plays it on his or her computer, workstation or other Internet terminal. This can be a web page type player or a downloaded player that is resident on the user's terminal. When the user's terminal receives a track to be played, the user's terminal takes the program data associated with that track and uses that data to access one or more servers to retrieve the supplemental information.

When a user logs onto a server to receive the program materials, a tracking event is provided to a measurement server. The measurement server stores the event and additional tracking information. The tracking information can include, for example, a date/time stamp, program data identifying a current segment and other relevant information.

Additional tracking events can be generated and stored based on user activities. Such activities can include, for example, log-on and log-off events, retreival of supplemental information, ordering of products and other user activities. The data provided to the measurement server can also include demographic data for the various users. In this manner, tracking events can be filtered or summarized by demographic information.

The tracking event and associated information can be stored in a database for historical or archive purposes. This data can be later recalled and reports run to provide listener information to a broadcaster. The data can also be provided to the broadcaster in real time such that the broadcaster can get an indication of their listening audience. Real-time information such as this can show a program director or other person the number of listeners at any given moment.

Further features and advantages of the invention as well as the structure and operation of various embodiments of the invention are described in detail below with reference to the accompanying drawings.

BRIEF DESCRIPTION OF THE DRAWINGS

The present invention is described with reference to the accompanying drawings. In the drawings, like reference numbers indicate identical or functionally similar elements.

FIG. 11 is a diagram illustrating an example song table and provider table according to one embodiment of the invention.

DETAILED DESCRIPTION OF THE INVENTION

The present invention is directed toward a system and method for measuring the viewing or listening habits of a viewer, listener or other user of broadcast materials. According to one specific implementation of the invention, user events such as tune-in, tune-out and other events are detected as they occur. These events can be provided to the broadcaster such that the effect of programming decisions can be seen in real-time. These events can also be stored for historical purposes such that reports and data analyses can be done after the fact.

Figure 1:
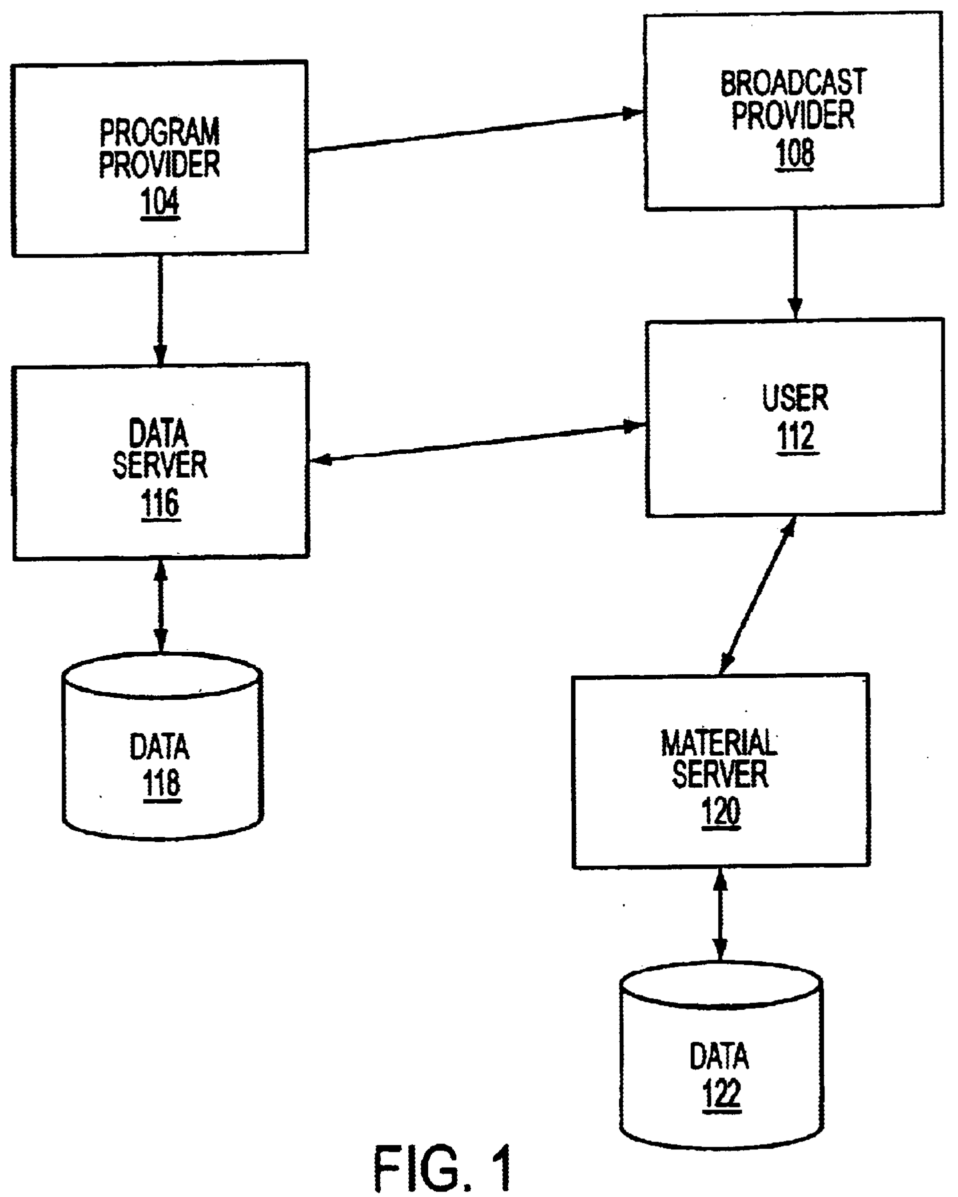
FIG. 1 is a block diagram illustrating an example architecture for providing supplemental materials in coordination with broadcast materials according to one embodiment of the invention.

Before describing the invention in detail, it is useful to describe one or more example environments in which the invention can be implemented. After reading this description, it will become apparent to one of ordinary skill in the art after reading this description. FIG. 1 is a block diagram illustrating an example architecture for providing broadcast materials to a user. The example architecture illustrated in FIG. 1 includes a program provider 104 for providing broadcast materials to a user equipment 112. Program provider 104 can provide, for example, broadcast materials such as a radio program, a video program, or other broadcast materials on another program medium. For example, in one embodiment, program provider 104 can be a radio station broadcasting its radio program to a number of listeners.

Program provider 104 can provide its broadcast materials directly to a user's user equipment 112 or alternatively, via a broadcast provider 108. Broadcast provider 108 may be included to allow the broadcast material to be forwarded to the user via an alternative medium. For example, in one embodiment, an example of a broadcast provider 108 can be a service provider such as, for example, www.broadcast.com that provides radio broadcast materials to user equipment 112 via the Internet. In this document, the term "broadcast" is used to describe the delivery of broadcast materials to one or more than one user or other destination via a hard-wired or wireless communication channel.

Depending on the broadcast or delivery medium, the user equipment can include, for example a processor-based system, such as a personal computer (PC) or other processor-based system, having an appropriate communication interface. In the Internet embodiment described above, user equipment 112 can include, for example, an Internet terminal having an Internet communication interface.

In the embodiment illustrated in FIG. 1, program provider 104 provides information pertaining to the broadcast materials to a data server 116. For example, program provider 104 can provide to data server 116 an identification of the broadcast materials that are being broadcast or otherwise provided to user equipment 112. This data can be sent in real time as the broadcast materials are being broadcast or otherwise sent to user equipment 112. Alternatively, the data can be sent in advance of the delivery of the broadcast materials. If sent in advance, the data preferably also includes a schedule for the programming materials such that supplemental information associated with the broadcast materials can be coordinated with the broadcast materials, as discussed below.

In operation, data server 116 utilizes the data received from program provider 104 to retrieve supplemental materials related to the broadcast materials and to provide those supplemental materials to user equipment 112 in coordination with the broadcast materials. Thus, in one embodiment, Data server 116 uses the data from program provider 104 to retrieve the associated supplemental materials from its one or more data storage databases 118 and provide these materials to user equipment 112.

In the context of the radio station example, data from program provider 104 can include event codes identifying the item being broadcast to user equipment 112. Event codes can be codes indicating, for example, a current song being played, an advertising spot being played, or other material in the stream of broadcast materials being broadcast by program provider 104. Continuing in this example scenario, data server 116 can retrieve supplemental information pertaining to the specific item of programming being broadcast such as, for example, images, video clips, or textual data relating to the material being broadcast.

In an alternative embodiment, the supplemental materials are not necessarily stored in databases 118 of data server 116. Instead, the supplemental materials can be stored in one or more external data bases 122 associated with one or more external servers 120. Thus, also illustrated in FIG. 1 is a material server 120 and its associated data base 122. In this embodiment, when data server 116 uses the data from program provider 104 to retrieve locational or other identification information about the supplemental information to be coordinated with a broadcast. Data server 116 provides this locational or identification information to user equipment 112. User equipment 112 then uses this locational or other identification information to access server 120 to retrieve the associated supplemental materials from one or more material servers 120.

Figure 2:
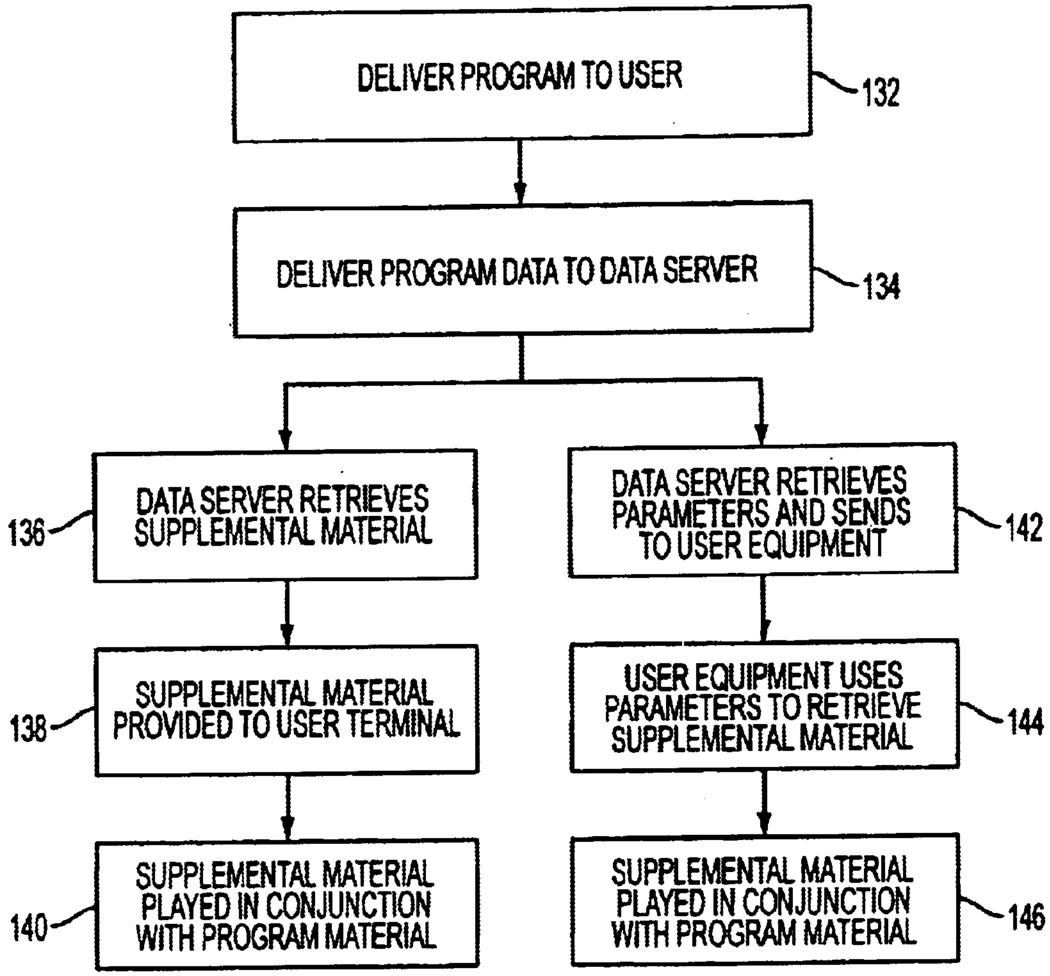
FIG. 2 is an operational flow diagram illustrating a process for coordinating supplemental materials with the program provided to user equipment according to one embodiment of the invention.

FIG. 2 is an operational flow diagram illustrating a process for coordinating supplemental materials with the program provided to user equipment 112 according to one embodiment of the invention. Referring now to FIG. 2, in a step 132, program provider 104 delivers its broadcast materials to user equipment 112. As stated above, the broadcast materials can be audio, video or other broadcast materials including, for example, a radio broadcast, a television broadcast, an educational broadcast or other delivery of broadcast materials to a user equipment 112. As illustrated in FIG. 1, delivery of the broadcast materials can also be accomplished via an intermediary broadcast provider 108. In one example, the intermediary broadcast provider 108 can be, for example, an Internet provider 108, or other intermediary provider.

In a step 134, program provider 104 delivers data pertaining to the broadcast materials to data server 116. This data can include, for example in one embodiment, data identifying the broadcast material or the particular portion of broadcast material currently being broadcast to user equipment 112. This data can be provided in real time as the broadcast material is being provided to user equipment 112, or, alternatively, in advance of delivery of the broadcast material.

As described above with reference to FIG. 1, there are at least two alternative embodiments by which the supplemental materials can be provided to user equipment 112 in coordination with the broadcast materials. Each of these embodiments are described with reference to FIG. 2 and are illustrated as parallel flow paths in the diagram of FIG. 2. In a step 136, data server 116 uses the data from program provider 104 to retrieve the supplemental materials from data base 118. As stated, these supplemental materials can include, for example, audio, video, image, data, or other information.

In a step 138, data server 116 provides the retrieved supplemental materials to user equipment 112 such that they can be played, displayed, or otherwise provided to the user in coordination with the broadcast materials. In one embodiment the data is provided to data server 116 in real time as the broadcast material is provided to user equipment 112. In this embodiment, data server 116 can simply retrieve the supplemental materials and provide them to user equipment 112 as the server receives the data from program provider 104. Alternatively, where the data is provided by program provider 104 in advance of the broadcast material, data server 116 can build a schedule for retrieval of the supplemental materials and their delivery to user equipment 112. In these or other alternatives, the supplemental materials are provided to user equipment 112 such that they can be presented to user equipment 112 in coordination with the broadcast materials. In a step 140, the supplemental materials can be played, displayed, or otherwise provided to the user in coordination with the broadcast materials.

Referring now to the parallel path of FIG. 2, in a step 142, the data server 116 uses the data from program provider 104 to retrieve supplemental material parameters from database 118. These parameters can include, for example, locational or other identification information pertaining to the supplemental materials. In one embodiment, this information provides an identification of where user equipment 112 may locate supplemental materials on another server such as, for example, server 120. These retrieved parameters are provided to user equipment 112.

User equipment 112 then uses this information to retrieve the supplemental materials from another location. In one embodiment, user equipment 112 access server 120 to retrieve the supplemental materials from data base 122. This is illustrated by a step 144.

This data is now available to user equipment 112 in coordination with the broadcast materials. Thus, in a step 146, the supplemental materials can be played, displayed, or otherwise provided to the user in coordination with the broadcast materials. As with the previous embodiment, data from program provider 104 can be presented in real time or in advance of the broadcast materials.

In one embodiment, user equipment 112 can include the processing ability to either receive the supplemental materials from server 116 and provide them to the user in coordination with the broadcast materials or to retrieve the supplemental materials from material server 120 and provide them to the user in coordination with the broadcast materials. For example, in one embodiment, user equipment 112 is a computer system capable of receiving information via communication links including, for example, the Internet, and also capable of retrieving information using similar links. Where user equipment 112 is a computer system, a player may be provided to the user such that the user equipment 112 can play the broadcast material and the supplemental materials provided from program provider 104.

Figure 3:
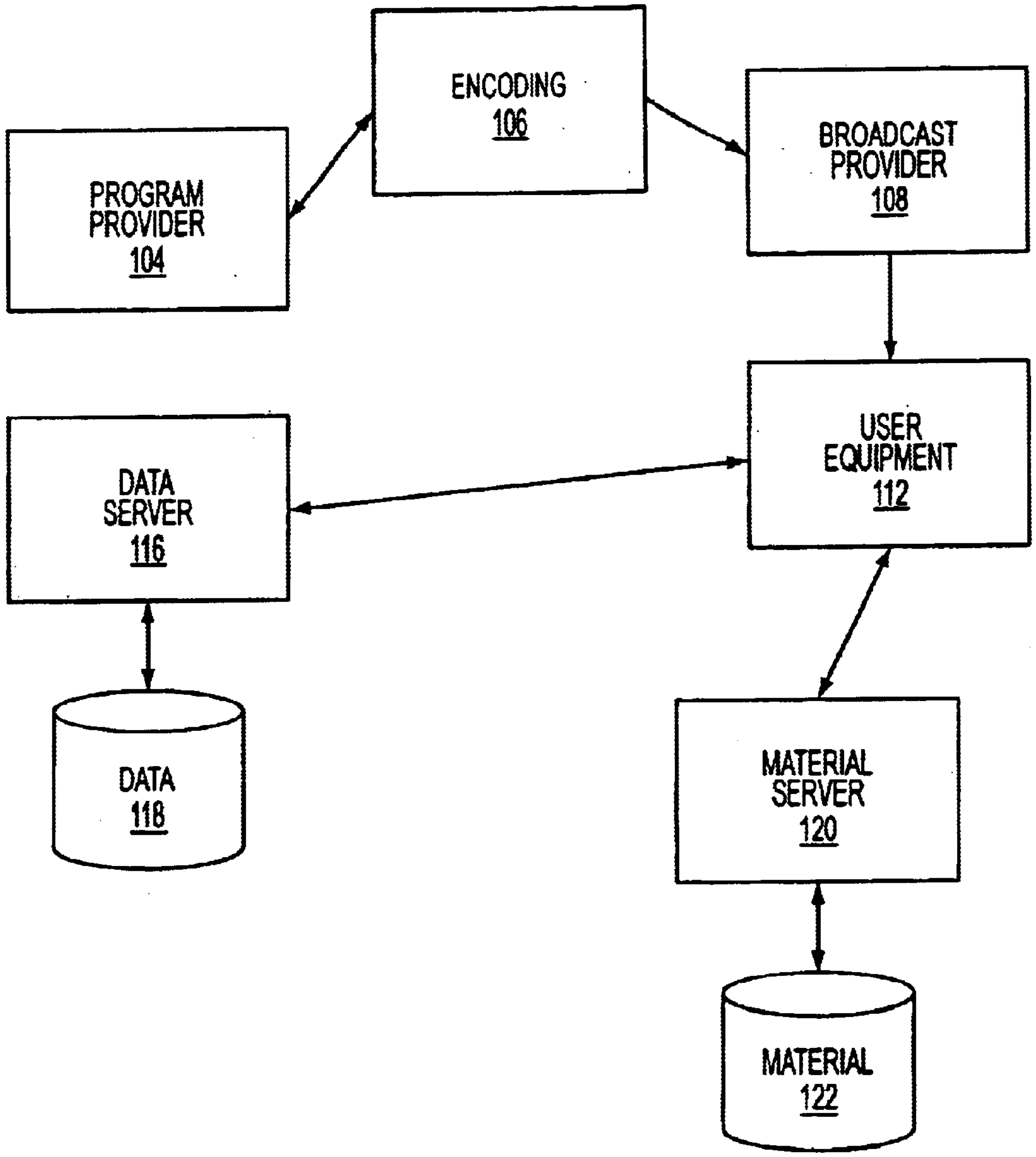
FIG. 3 is a block diagram illustrating an alternative embodiment to the architecture illustrated in FIG. 1.

FIG. 3 is a block diagram illustrating an alternative embodiment to the architecture illustrated in FIG. 1. According to the alternative illustrated in FIG. 3, program data relating to the broadcast material is not directly provided from program provider 104 to data server 116. Instead, in this embodiment, data pertaining to the broadcast materials is provided along with the broadcast materials to the user equipment 112. This can be done either directly, or via an interim provider such as, for example, broadcast Internet service provider 108.

Figure 4:
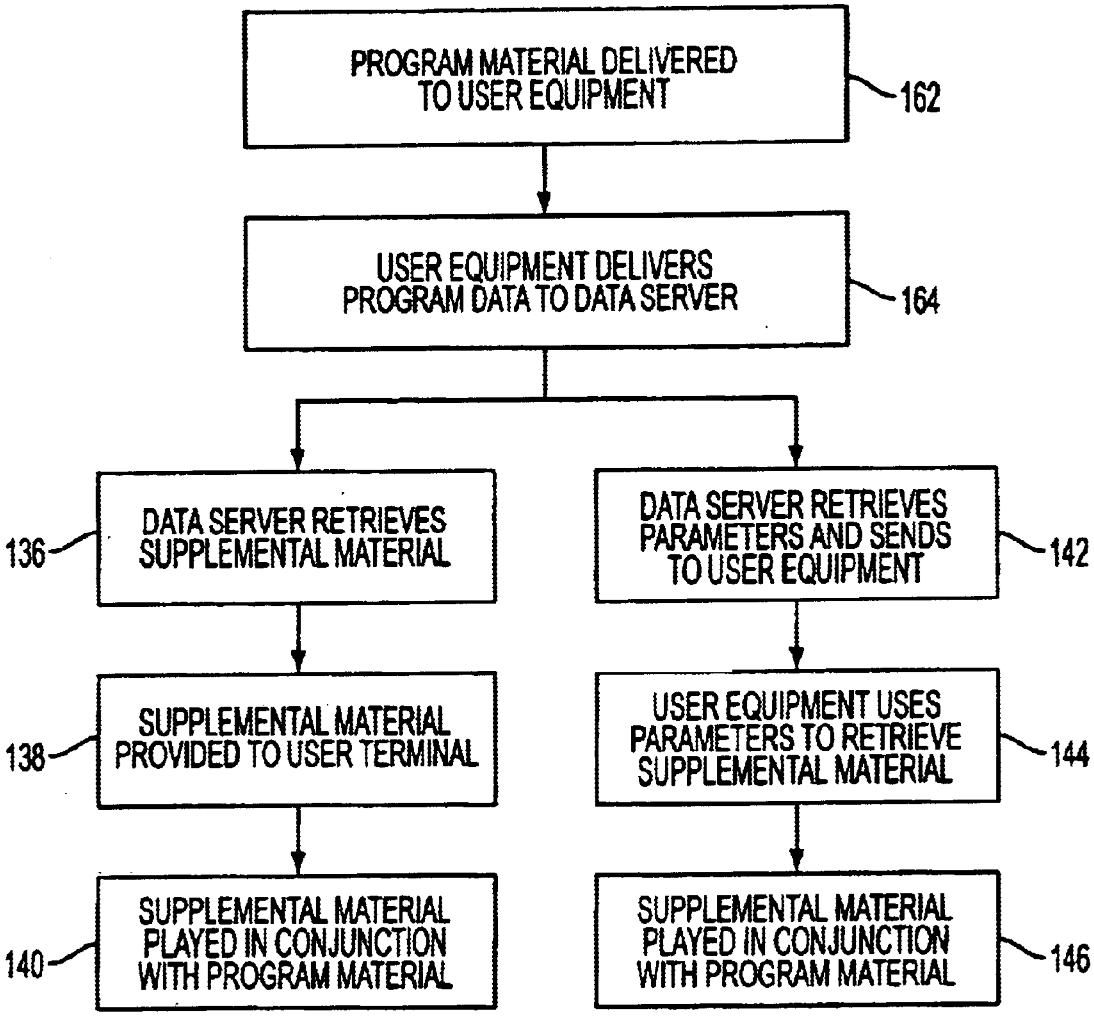
FIG. 4 is an operational flow diagram describing the coordination of supplemental materials with the broadcast material according to the example embodiment illustrated in FIG. 3.

FIG. 4 is an operational flow diagram describing the coordination of supplemental materials with the broadcast material according to one or more realizations of the embodiment illustrated in FIG. 3. Referring now to FIG. 4, in a step 162, program provider 104 delivers the broadcast material to user equipment 112. In this step, the data relating to the broadcast material (i.e., the program data) is included in the signal provided to user equipment 112. In one embodiment, the program data and broadcast material are multiplexed onto a single data link and provided to user equipment 112 either via a broadcast provider 108, or directly to user equipment 112.

In embodiments where the data and broadcast material delivered to user equipment 112 is ultimately in digital form, the program data can be interleaved with the broadcast materials in a digital data stream. This can be done by interleaving packets, or by interleaving the data in packet data blocks, or by interleaving the data streams together.

In a step 164, user equipment 112 delivers the program data to data server 116. Data server 116 receives the program data in real time or near real time with the associated segment of broadcast material. From this point on, the operation can continue as illustrated above in FIG. 2 whereby the supplemental information is either retrieved directly from data base 118 and provided to user equipment 112 (steps 136, 138, 140) or whereby locational or other identification information is provided to user equipment 112 which then in turn receives this supplemental information from data base 122 (steps 142, 144 and 146).

Having thus generally described a system and method for coordinating supplemental information with broadcast material provided to user equipment 112, a specific application of this generalized system is now described. This specific application is described in terms of the above-mentioned example in which a radio station provides its normal broadcast material to a listener. In addition, the radio station desires that additional supplemental materials be provided to the listener through the use of one or more servers. Although the invention is now described in terms of this specific application, it will become apparent to one of ordinary skill in the art after reading this description that the invention is not limited to this specific application but can be more generally applied to other applications as well. This description is thus provided for illustration purposes only.

Figure 5:
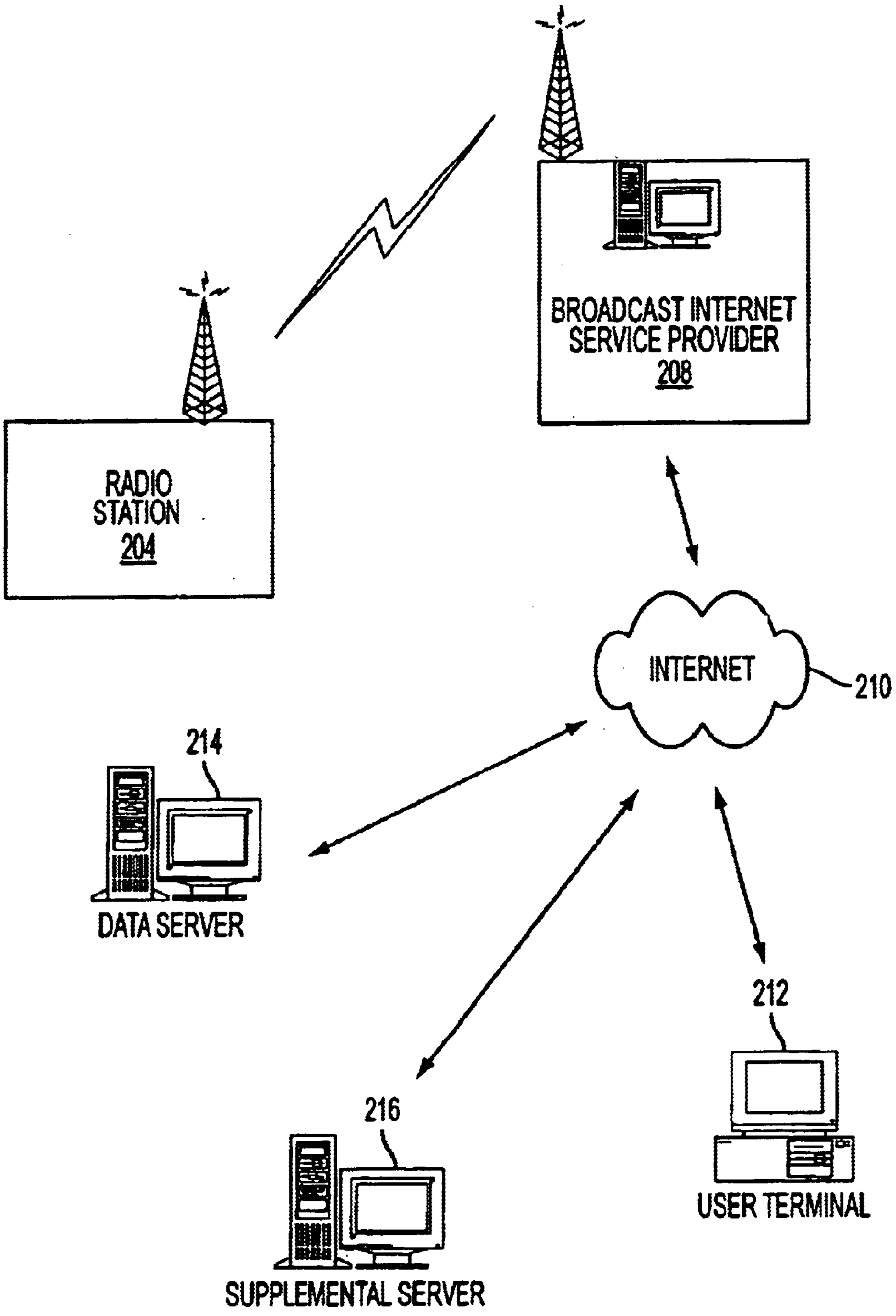
FIG. 5 is a block diagram illustrating the example application of the invention in which a radio station provides its broadcast materials to a listener at a user terminal according to one embodiment of the invention.
Figure 6:
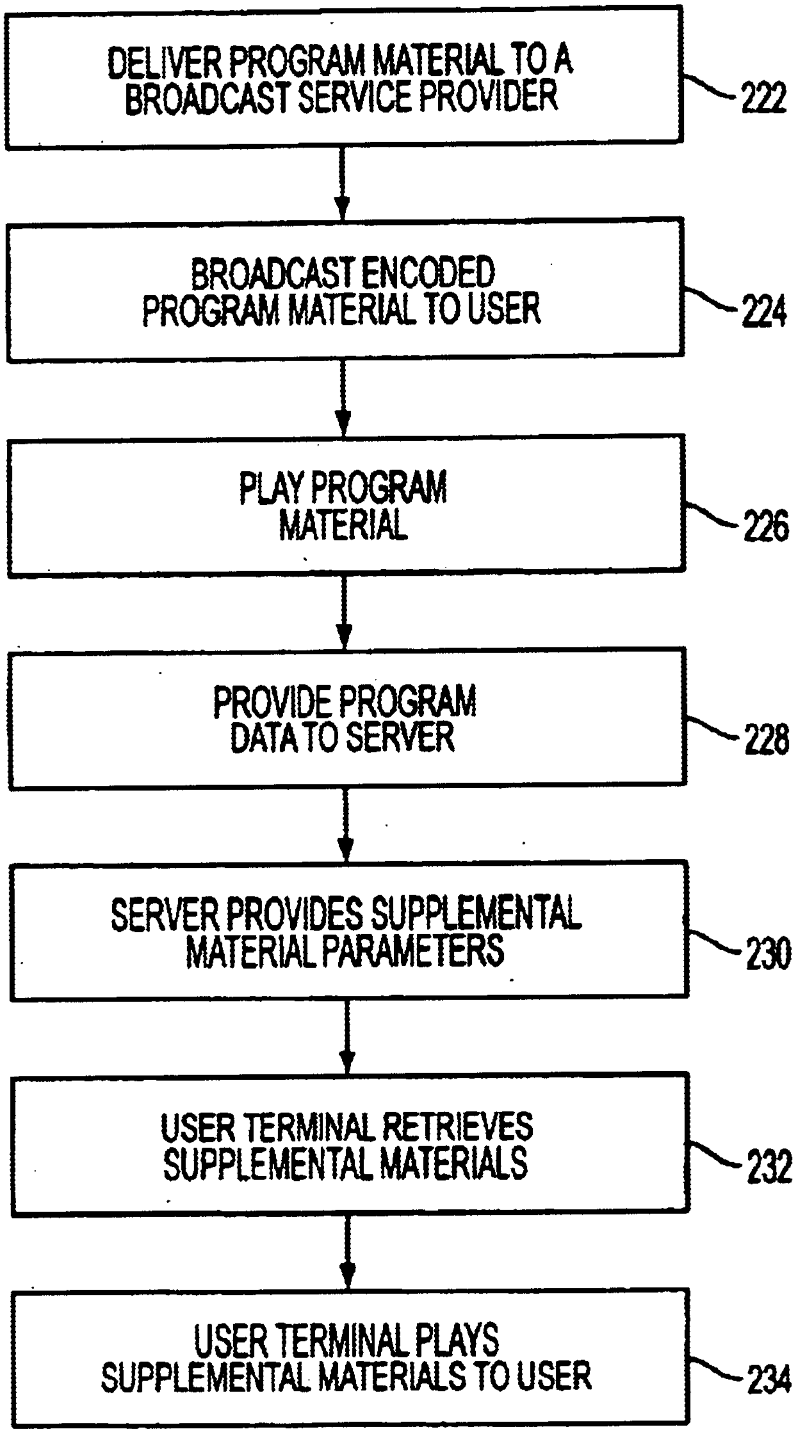
FIG. 6 is a operation flow diagram illustrating an example process by which supplemental information can be coordinated with the broadcast material in the example application illustrated in FIG. 5.

FIG. 5 is a block diagram illustrating the example application of the invention in which a radio station 204 provides its broadcast materials to a listener at a user terminal 212 according to one embodiment of the invention. FIG. 6 is a operation flow diagram illustrating an example process by which supplemental information can be coordinated with the broadcast material in the example application illustrated in FIG. 5.

In a step 222, radio station 204 provides its broadcast materials to a broadcast Internet service provider 208. In one embodiment, the materials provided to broadcast Internet service provider 208 can include the actual radio broadcast from radio station 204 as well as event codes indicating current tracks in that broadcast, current advertising in that broadcast, or other data associated with the real time broadcast. In one embodiment, these signals can be broadcast via an AM or FM radio link to broadcast Internet service provider 208.

In this embodiment, both the audio and the data can be modulated onto an AM or FM carrier signal at a desired frequency. In alternative embodiments, the broadcast materials and the data can be provided to broadcast Internet service provider 208 in a digital format, encoded, compressed or otherwise, through either a hard-wired or wireless communication link. As is well known to those in the radio industry, many radio stations pre-program their broadcast material such that it can be broadcast in an automated fashion. Thus, the broadcast material and program data can also be provided in this fashion. Systems available to facilitate such pre-programming include the DAD Pro system available from ENCO Systems, Inc., the Master Control from Radio Computer Systems, Inc. and the Audio Wizard from Prophet Systems, Inc.

These systems typically store the broadcast materials in advance on a hard drive or other data storage. As such, this data in digital form can be downloaded to broadcast Internet service provider 208 via any of a number of communication links and protocols and in any of a number of formats. Alternatively, a copy of a disc or other electronic medium on which the program is stored can be provided to broadcast Internet service provider 208 to physically provide the broadcast material and data.

In an example application of the radio station, the program data can include, for example, a cut number, a category of the cut, and a duration of the cut. In these embodiments, the cut number can include number or other alpha-numeric designation assigned by the radio station for recorded components that air on their station. These components can include, for example, songs, commercials, promotions, or other "cuts" or segments that may air on the radio. The program data can also include an identification of the broadcasting station, allowing unique codes or data sets to be maintained for different stations.

The cut number can be a numeric or alphanumeric identification (ID) that identifies the particular cut. The category of the cut can include, for example, an identification of the type of cut to which the cut number or program data refers. For example, the cut category may differentiate between music, ad traffic, DJ segments, and link promos. Other or additional categories can be included as well.

Additionally, information pertaining to the format of the cut can be included as well. Such format information can further indicate a type of music (e.g., pop, rock, jazz, classical, country and western, etc.), or a type or category of product being advertised (e.g., clothing, food and beverage, insurance, automobile services, etc.). This format information can be used to key particular pieces or categories of supplemental material to the broadcast.

As stated, a station can include a station ID in this program data to uniquely identify that station from among a plurality of other stations that may be sending data to broadcast Internet service provider 208. In one embodiment, however, broadcast Internet service provider 208 does not need such an identification signal as it may use other means for determining the identity of the radio station 204, such as, for example, the channel on which the signal is received.

In alternative embodiments, analogous data fields can be provided with the program data. For example, other broadcast material types can include a segment ID, analogous to the cut code, or cut number, and identifying the segment; a segment category, identifying a category or class to which the segment belongs.

In a step 224, broadcast Internet service provider 208 "broadcasts" the broadcast material including the program data to user terminal 212. In the embodiment illustrated in FIG. 5, this "broadcast" is via the Internet 210. Thus, broadcast Internet service provider 208 provides the broadcast materials in a digital format downloaded to user terminal 212 via the Internet 210. In the illustrated embodiment, this digital data includes the broadcast material and the program data. As stated with reference to FIG. 1, in alternative embodiments, the program data can be provided directly to data server 214, which transmits the data to user terminal 212.

User terminal plays the broadcast material to the user as illustrated by a step 226. In one embodiment, user terminal 212 can access and "play" the broadcast material via a web page format. In an alternative preferred embodiment, user terminal 212 includes a player that is used to play the broadcast material downloaded via the Internet 210. This player can be a general purpose audio player or audio/video player capable of playing the broadcast material, as well as any received supplemental materials. Specific embodiments of an exemplary player are described below, although alternative players can be implemented.

In a step 228, user terminal 212 retrieves the program data from the downloaded broadcast materials and provides this program data to data server 214. Again, this program data can include data pertaining to a specific portion of the broadcast material currently being broadcast. In one embodiment as discussed above, this program data can include a cut number, a cut category, and a duration. Additionally, this can include a station ID such that cut number or other codes from different stations can be differentiated. As stated above, the station ID can be generated originally from radio station 204 and provided to broadcast Internet service provider 208 and thus included in the downlink to user terminal 212 via the Internet 210.

Alternatively, station identification can be generated by the user terminal 212 based on a particular station that the user is currently listening to. For example, in embodiments where user terminal 212 includes a player, the station selected on that player can be identified by the player and this identification included in the transmission to data server 214. In one embodiment, the data transmitted to data server 214 is also transmitted over the Internet 210. However, alternative communication means could be included. Preferably though, the Internet is used as the communication resource without requiring additional communication media to be introduced.

In a step 230, data server 214 uses the program data to retrieve information pertaining to supplemental materials. As described above, the supplemental materials can include, for example, images, videos, audios, text, or other data. In one embodiment, the information or parameters retrieved by data server 214 can include, for example, a URL or other location information to identify where the one or more various supplemental materials may be located on additional supplemental servers 216. Data server 214 returns the information pertaining to the supplemental materials to user terminal 212. This return path can also be implemented by the Internet 210 or other communication path.

Additionally, as stated above, some or all of the supplemental materials may be located on data bases directly associated with ID server 214. In this alternative, these materials can be directly returned to user terminal 212.

In a step 232, user terminal 212 uses the information provided by data server 214 to retrieve the supplemental materials from another server such as, for example, supplemental server 216. In Internet implemented embodiments, a URL provided by data server 214, for example, can be used by user terminal 212 to retrieve web-based images, videos, audio clips, text files, HTML files, or other data or information from a web server via the Internet.

In a step 234, user terminal 212 provides the retrieved supplemental materials to the user while the user is listening to the broadcast materials. This provision is generally referred to as "playing" the supplemental materials, regardless of whether the played materials are audio, video, still images, text or other data. Because the supplemental materials can be retrieved based on the program data associated with a current segment, the supplemental materials can be coordinated with the broadcast material.

As can be seen by the above description, there is a wealth of additional supplemental information that can be provided to a user at his or her user terminal 212 to accompany the broadcast materials broadcast by radio station 204. To list just a few examples, the user may be provided with an image of an album currently being played, album title, artist, and track number, links to purchase the album, additional materials such as promotional materials, concert schedules and materials, memorabilia, artists bios, other images or videos relating to the album or artists, or virtually any other information that may be somehow related to the current item being played by radio station 204.

Additionally, advertising information can be retrieved and provided on user terminal 212 in conjunction with the current broadcast material. For example, particular advertising spots may be keyed to particular songs or broadcast material to further enhance the user interface. Advertising can be keyed to attributes identified by the program data such as music types, products or product categories, artists, and so on.

Additionally, where the current broadcast material is an advertising spot, additional supplemental information may be coordinated with that advertising spot to allow the advertiser to offer special goods or services to the user. For example, the supplemental materials may provide electronic or virtual coupons that can be provided to the listener in conjunction with a broadcast advertisement. For example, the supplemental materials can include a coupon that is downloaded to the user and printed by user terminal 212, or a special alphanumeric code that can be written down by the user and brought to a point-of-sale outlet.

Another example of supplemental materials in the advertising or promotional capacity may include the provision of contest materials to the users. For example, the supplemental materials may include lottery numbers, electronic "puzzle" or game pieces, and the like.

Still further, banner ads or other advertisements may be pulled up, and their display can be coordinated with the broadcast material. For example, the advertisements can be directed toward products or services related to the current track, or other advertisements that may appeal to listeners of the current broadcast material. As further described below in conjunction with this and other embodiments, there is a whole host of additional supplemental material that can be provided in coordination with the broadcast material.

As stated above, in one embodiment, the interface between radio station 204 and user terminal 212 can at least in part implemented via the Internet 210. Additionally, the link by which user terminal 212 accesses data server 214 to retrieve information pertaining to the supplemental materials can also be implemented by the Internet. Although communication media such as the Internet 210 have built-in latencies that may impact different user terminals differently, it is conceivable that a large number of user terminals 212 may attempt to access data server 214 simultaneously on the receipt of new program data. As such, random delay can be inserted into the path between a broadcast Internet service provider 208 and a one or more user terminals 212 listening to the broadcast. This random delay, which can be, for example, as much as 20 to 40 seconds, can allow the various accesses to data server 214 to be staggered among the plurality of users. As such, the load on data server 214 as well as on any supplemental servers 216 can be somewhat leveled.

Alternatively, the process can be randomized to spread out the impact to servers 214, 216. In one embodiment, the system can look ahead and use cut codes from future broadcast materials to retrieve supplemental information in advance, at randomized time intervals to level the server load. This can be accomplished, for example where cut codes are provided directly to server 214 in advance of the program.

In yet another embodiment, a look-ahead feature is provided, wherein program data for one or more upcoming tracks is used to retrieve supplemental materials prior to the actual playing of those tracks. Thus, supplemental materials can be retrieved in advance, and scheduled to occur at times when the servers are not being accessed by a large number of other users.

Additionally, the digital data provided to user terminal 212 can be compressed or encoded to allow for a more efficient communication path In one embodiment, compression is provided using the commercially available encoders such as, for example Microsoft's Net Show or Real's Sure Stream, and others. As already stated, the example embodiment described with reference to FIGS. 5 and 6 can be implemented in alternative embodiments with, for example, alternative broadcast material, alternative communication interfaces, and alternative forms of supplemental materials.

Figure 7:
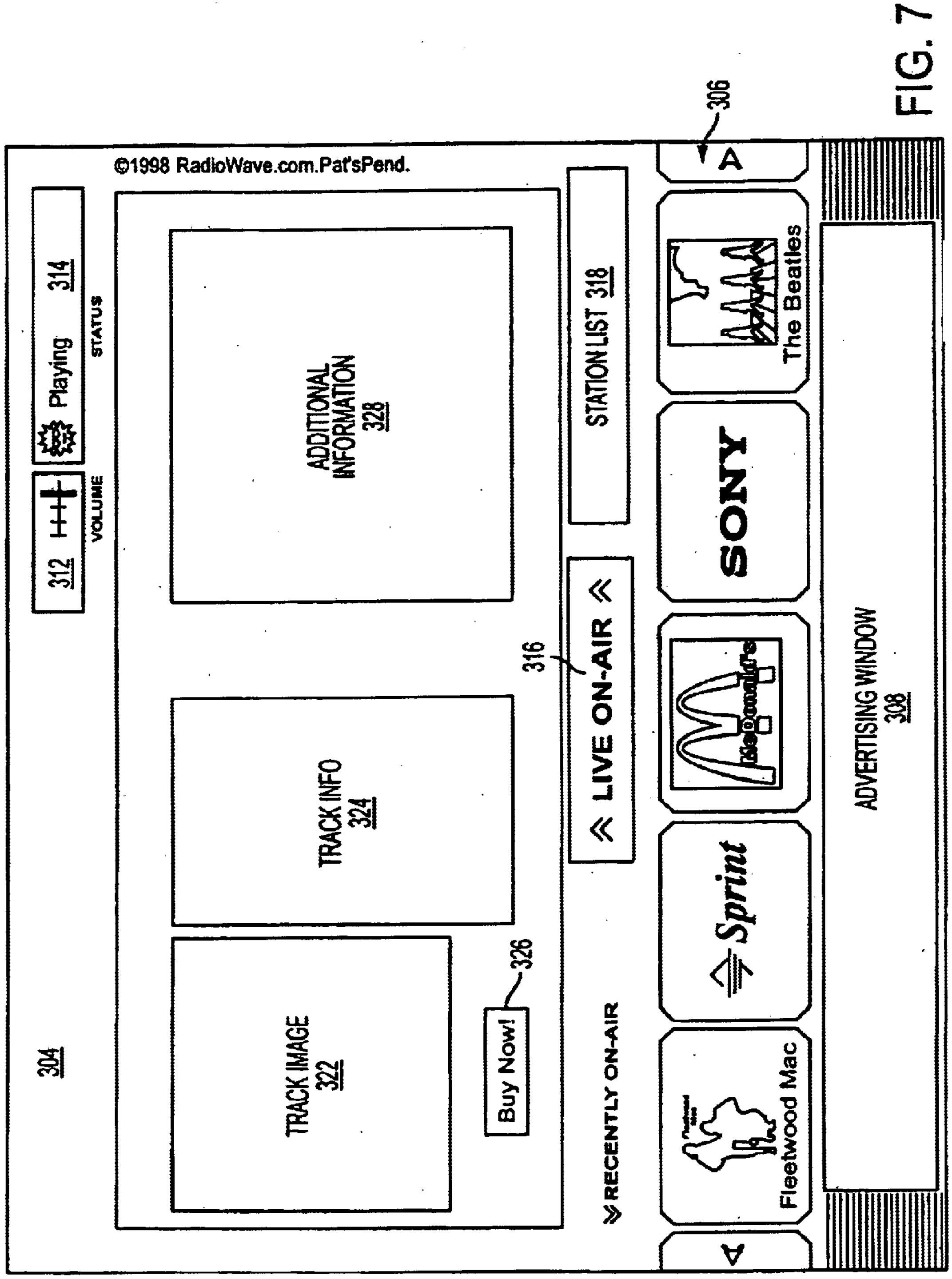
FIG. 7 is a diagram illustrating an example user interface for an example player according to one embodiment of the invention.

As stated above, in one embodiment, a player can be downloaded to the user terminal 212 to allow the user terminal 212 to play the broadcast material broadcast from the broadcast Internet service provider 208. The player is a software application resident on user terminal 212. Although the format and features of such a player are theoretically unlimited, one example player is now described in order to illustrate the features and functionality that can be provided or included in one or more alternative embodiments of a player. FIG. 7 is a diagram illustrating a screen shot of an example player according to one embodiment of the invention. Although this example player is now described in terms of the example screen shot, it will become apparent to one of ordinary skill in the art after reading this description how alternative players can be implemented and how alternative user interfaces or user screens can be provided with a player.

Referring now to FIG. 7, the player illustrated in FIG. 7 includes four parts: a data window 302, a player interface 304, a history window 306, and an advertising window 308. Each of these components are now described in accordance with one example implementation. In the example illustrated in FIG. 7, player interface 304 can include virtual buttons or selectors that can be selected or otherwise manipulated by the user using a mouse, track ball, keyboard, touch-screen display or other pointing or manipulation device. The controls illustrated in the example of FIG. 7 include a volume control 312, a status display 314, a on-air display 316, and a station list button 318.

Although not illustrated, other controls or input devices can be provided including, for example, a tuner button or knob to allow stations to be changed or "tuned" using the player interface 304 or another interface. Also, the player interface 304 can include other controls such as, for example, balance controls, tone controls, a mute button, and other controls or features that may be desirable for an audio or audio/video player.

Data window 302 provides a place to display supplemental information or materials retrieved from other servers such as data server 116 or supplemental server 120. For the example of the radio station as provided in FIG. 5, data window 302 can include an album image 322, artist or album or track information 324, a buy now button 326, and additional information selection area 328. Data window 302 can be implemented to include other or additional information or supplemental materials as well.

In embodiments where user terminal 212 is provided with URL's to retrieve supplemental materials, the URL's can be used to retrieve some or all of the information provided in the example data window 302 and display the retrieved information. In alternative embodiments, other mechanisms can be used to retrieve and display information in data window 320.

Returning now to the specific example, album image 322 is a picture or other image, preferably in a GIF format (e.g., *.gif) that provides a graphical representation to accompany the current song being played. These GIF images can be stored locally on data server 214 and provided to user terminal 212 upon receipt of the program data, or otherwise retrieved by user terminal 212 from supplemental server 216. In one embodiment, the album image 322 is an image similar to or the same as the album cover image. Thus, for example, a listener tuning into a radio station using the player can also view the album cover of the album on which the current song can be found.

Where the current track is an advertising track, album image 322 may be an image designated by the advertiser that the advertiser would like listeners to be able to view upon hearing the advertisement being played. This for example can be pictures of the product, company logos, videos, or other images that the advertisers feel would entice the listener or provide additional information to the listener.

Track information 324 can be used to provide additional information regarding the current track. For example, where the current track is music, track information 324 can display the artist's name, the current song being played, the album on which the current song can be found, the record label, and any other information that may be useful or pertinent regarding the current track. Similarly, when the track being played is a commercial, product information, specifications, sizes, prices, or any other pertinent material or desirable information can be displayed in track space 324. As with the other forms of supplemental information, this information can be directly retrieved from a data server 214 or alternatively via supplemental server 216.

Preferably, in one embodiment, a retrieval and display of album image 322 and track information 324 occurs automatically without user interaction upon receipt of program data. That is, these images and information are retrieved by user terminal 212 as soon as the program data is received. Playing of the track can begin immediately, or can be delayed until some or all of the supplemental materials are received.

Additional info portion 328 can be used to provide additional information to the user or to provide menu selections that the user can interact with to select or obtain additional information or supplemental materials regarding the current track. For example, additional information can include buttons to allow the user to select additional information such as, for example, artist information, concert tour information, album information, a "libretto" having words to the track being played or to other tracks on the current album, ticket information for upcoming concerts, merchandising materials, and other information that may be of value or that a user may foreseeably desire.

Preferably, in one embodiment, these selections provide information pertaining to the current track being played, again based upon the program data that is received for the current track. This can be information relevant to a current song being played or additional information relative to an advertisement being played. In one embodiment, the specific information "behind" these buttons is not retrieved by user terminal 212 until a button is clicked. Therefore, in this embodiment, user terminal does not go through the steps of retrieving information from a server until that information is actually requested. Alternatively, of course, all of this information can be accessed and retrieved upon receipt of a program data code; however, this may result in unnecessary loading of the communication channels.

Additionally, in one embodiment, the URL's or other locational information pertaining to the information behind these buttons is also not received or retrieved from ID server 214 until requested. Alternatively, the URL's for the information are retrieved such that the response time when a button is clicked is that much faster for the user. As stated, for advertisements, this information or the buttons can provide selections pertinent or relevant to the product being advertised. For example, selections such as additional product information, shipping or delivery information, availability information, links to a company's complete catalog or web page, product safety information, competing product information, or other information that a user may find useful or relevant can be linked to using additional information selection area 328.

Also illustrated in the example player of FIG. 7 is a buy now button 326. In one embodiment, buy now button 326, when selected, activates a link to a source whereby the user can purchase the album title being played. For example, in one embodiment, when the user clicks buy now button 326 the URL associated with a supplier of the album is retrieved. The user terminal 212 accesses the supplier's web site, allowing the user to purchase the album on-line. One example of a supplier web site is www.amazon.com In one embodiment, buy now button 326 can bring up a list of potential suppliers such that the user can select which of a plurality of suppliers he or she wishes to access to purchase the album. Alternatively, in other embodiments, the user is not provided with the choice, but instead a single click on buy now button 326 brings the user directly to the preferred supplier. The supplier may of course vary depending upon the album title as not all suppliers carry all titles.

In one embodiment, when program data is received at user terminal 212 and used to access the supplemental information, this supplemental information returned for the album title is a specific page within the supplier that links directly to that particular album. For example, where the supplier is www.amazon.com, the URL retrieved to be associated with the buy now button 326 is the URL that maps directly to the page or pages in the Amazon.com® website that relate to the current track or album. Therefore, the user in this embodiment does not have to work his or her way through several web pages to get directly to the pages pertaining specifically to the album being played.

In one embodiment, when the buy now button 326 is clicked, the appropriate or related web pages can be brought up directly within data window 302. They can be configured to span the entire area of data window 302, or alternatively, to be a subset thereof. Additionally, a separate window can be opened or a separate browser launched, to allow the retrieved pages to be viewed in a windowed manner with respect to the player. Of course, the player and the window can be sized such that they both can be viewed simultaneously. The player is not limited to a single buy now button 326 and can have buy now buttons relating to the album, concert tickets, or additional materials. Also in this embodiment, it is not necessary that the buy now button 326 be on the first instance of data window 302. Buy now buttons can be interspersed within the various supplemental images that are brought up as the user navigates through the variety of supplemental information available.

Additionally, the supplier does not have to be an on-line supplier. In these alternative embodiments, buy now button 326 can execute another action to facilitate purchase of the title or advertised product by the alternative supplier. For example, the button can cause an e-mail purchase order to be generated and sent, a phone call to be placed, or some other purchase-initiating action.

In one embodiment, concert information can be provided specifically based on the geographic location of the user. Thus, a user can immediately see when the artist will be appearing next in his or her area. Again, a buy now button can be associated with this concert such that the user can access a site selling tickets to the concert or concerts, or otherwise initiate a purchase of concert tickets.

In another embodiment, a button can be provided to allow the user to obtain information regarding other artists with a similar style, feel, or sound as the current artist or track. Therefore, if a listener is particularly fond of the selection being played, that listener can search for other titles or artists who also have a similar sound, style, or feel. This embodiment can use a data base that provides relational information for the various artists based on their style, sound, or other features or characteristics of the artist. In an extension of this embodiment, the user or listener may also be provided with the ability to click to select sample sound tracks from various other artists or albums that are selected in this manner.

Therefore, if a user likes a particular sound and wants to hear a brief sample of an album by another artist, this can be accomplished with a simple selection by the listener. In one embodiment, this can be facilitated by providing the URL's of locations where the sample tracks can be found. Alternatively, a data base can be maintained within supplemental server 216 that allows sample tracks to be stored directly therein. Additionally, sample tracks can be provided for the current album such that the listener can sample other tracks of the current album before deciding whether to purchase that album.

Where the current track is an advertisement, buy now button 326 can similarly be used to provide a link to a site through which the user can purchase the product or products being advertised. Similar to the music track, this can be a direct link to the supplier's page or pages that offer their particular product for sale, or to the company's home page such that the user can browse through and obtain information about the company and all of its products.

In one embodiment, virtual coupons can be implemented whereby an "on-line" coupon is offered to the listener. In this case, a button may be provided that enables a user to select a coupon. For example, a user may click on the select coupon button causing the coupon to be printed out on a printer associated with the listener's machine. Advertisers may use this virtual coupon as a device for offering special promotions to web-based listeners. Of course, coupons can present special deals and can have expiration dates and other features or aspects associated with conventional paper coupons.

A history window 306 can also be provided to display a history of tracks played by the radio station 204 or other program provider 104. In one embodiment, history window 306 is a sliding window that illustrates a predetermined or selectable number of the most recent tracks contained within the broadcast material. The history window, in one embodiment, is a chronological display of past tracks played. The display does not need to be chronological, however, this organization may represent a more user friendly interface. Where cut codes or other information pertaining to future tracks is available, the history bar may also be used to provide a look into upcoming programming.

The history window 306 can also include scroll buttons or a scroll bar such that the listener can scroll through the various selections in history window 306. History window 306 does not need to be limited to displaying a history of music tracks played, but can also display a history of advertising or other tracks included in the broadcast material. History window 306 can provide a means for a listener to easily go back and retrieve information on past tracks.

In one embodiment, the user simply clicks on one of the windows in the history bar to bring up the information for that selection. For example, in the embodiment illustrated in FIG. 7, history window 306 shows the five most recent tracks played. These are, in chronological order (oldest to most recent), the Beatles, a Sony advertisement, a McDonald's advertisement, a Sprint advertisement, and a Fleetwood Mac selection. In the embodiment illustrated, the Fleetwood Mac selection is the one that was most recently on air. If, for example, the listener wanted to obtain additional information about the Beatles selection that was being played, the user may simply click on the Beatles window and that information can be displayed on data window 302. In this case, live-air indicator 316 may change to show it is no longer a live selection.

However, with the history information pulled up, in one embodiment, the user can access all of the information that he or she could have accessed via the various buttons and selections when the selection was originally being played. Thus, even if the user did not take the opportunity to check on concert information or album information or to order an album when the song was originally played, the user can go back via the history bar and take the opportunity to do so at this time. In one embodiment, all that is saved is the program data for each item in the history window. Therefore, when the user makes a selection, the process of retrieving supplemental information for the selected item begins again from scratch.

Alternatively, any or all of the information previously retrieved when that track was initially played can be stored locally such that the information does not have to be re-retrieved when a history selection is made. Of course, depending on the amount of information retrieved and the storage space available, the number of selections for which material can be stored may vary. In one embodiment, the amount of information saved can be user selected. In the case of an advertisement that included a virtual coupon, for example, the user can still go back to that advertisement and obtain the coupon.

In one embodiment, the history bar is maintained only for selections or tracks that were played while the listener terminal 212 was actively receiving broadcast material. Alternatively, program data from previous tracks prior to the time that the user terminal 212 was "listening" to the broadcast can be downloaded such that the history bar can be filled in for earlier tracks. This application is particularly suited for the embodiment in which the program data is provided from the radio station 104 directly to data server 116. In this embodiment, the server can maintain a history and schedule of the tracks played by a particular broadcaster during a given time period. However, the invention is not limited to this embodiment as this history can be maintained by keeping track of the program data codes that are received from data terminals 212 in the embodiment illustrated in FIG. 5.

There are several advantages that are obtained by providing a history bar such as that illustrated in FIG. 7. One advantage is that the user can go back and retrieve information pertaining to a selection that he or she may otherwise have missed. Thus, the user is afforded the opportunity to take advantage of things that can easily be missed in real time broadcasts. For example, a user may be listening to broadcast material in a car on his or her way to the office. The user may hear a song that he or she likes or perhaps may even hear an advertisement of a product that he or she is interested in purchasing. However, as the listener is currently driving down the freeway, it is not practical to write down the information provided.

Additionally, the user may wish to take advantage of the features provided by the player and cannot do so while listening in the car. Therefore, when the listener reaches his or her destination, the listener can bring up the player, access the broadcast broadcast material, and go back through the history bar 306 to find the track in which he or she was interested. For example, if the user wishes to purchase an album or obtain additional information about an album or track that was played on the radio while he or she was in the car, the user can simply select that album from the history bar and can retrieve all of the informational pertaining to that album.

Additionally, the user can purchase the product through the use of buy now button 326. Thus, simply because the listener was in the car, the listener has not missed the opportunity to obtain additional information about the track or purchase the album. In the case of advertisements, the user may wish to purchase a product that he or she heard advertised while in the car, or take advantage of a coupon that was advertised for a product while he or she was in the car. Similarly, the user can access the history bar 306, go back to the particular advertisement, and retrieve the coupon or other information that the user desires. Thus, the user has not lost the opportunity to purchase a product or obtain savings related to a product, simply because he or she was listening to the radio station in the car.

Unless the listener's user terminal 212 was on and active during the time the track of interest was broadcast, the data codes have not been provided to user terminal 212. Therefore, when the user activates his or her player, the player will retrieve the data codes for the period of time in which the player was active. In embodiments where program data is provided on server 116 from provider 104, data codes for the history prior to the time at which the player was active is also available. Additionally, server 116 may be able to obtain a history for the user based on codes or data received from other listeners of the same program. Alternatively, broadcast Internet service provider 208 may maintain a history of the data codes such that they can be provided to the user terminal to access information pertaining to past codes prior to the time at which the player was active.

An additional advantage of a history bar 306 is that the advertiser's advertising impression is provided with "air time" greater than that provided with the advertising time slot. For example, an advertiser's commercial may air for 15 to 30 seconds on the radio within the broadcast material. However, once the advertiser's logo is placed on a button in history window 306, that logo can remain on the bar for the duration of the following several slots, depending on the size of the history window. For example, in the embodiment illustrated in FIG. 7, in which the history window displays 5 active buttons, an advertiser's logo would be visible to the listener during the advertiser's time slot and also during the subsequent 4 time slots. For example, if these subsequent four time slots are music tracks of approximately 3 minutes in length, the advertiser's logo is available or has "air time" for an additional 12 minutes above and beyond that which it would otherwise receive.

Also illustrated in FIG. 7 is an advertising window 308. Advertising window 308 can be included to provide additional advertising slots to be displayed to the listener. In one embodiment, advertising window 308 displays banner ads or other ads of products provided by advertisers. The banner ads or other advertising materials for display in advertising window 308 can also be retrieved in a manner similar to the retrieval of the other supplemental materials. Thus, the advertisements can be coordinated with or coded to particular tracks within the broadcast material. This has the advantage that the advertising can be geared to the particular listener expected to be listening to a track that is currently playing in the programming material. As such, the advertising material is more relevant and of greater interest to the listener which is advantageous to both the listener and the advertiser.

For example, when a Grateful Dead track is being played, banner ads related to items of interest to Grateful Dead listeners may be keyed for appearance in advertising window 308. The importance of this feature can be further illustrated by considering a typical listening scenario. Because most listeners tend to listen to broadcast material such as radio information in the background, it is anticipated that the majority of the time that the player is active, the player will be operating in the background mode on user terminal 212. For example, where the listener is at his or her office working on other applications on his or her user terminal, the player may be active in the background, providing background music to accompany the listener throughout his or her workday. However, when the listener comes upon a particular track that he or she has great interest in, that listener may bring the player window to the forefront. As such, it is during this time, that the advertising window 308 is visible to the listener. Therefore, keying the advertisements to the track in the broadcast material maximizes the benefit of the advertisement occurring in advertising window 308.

Advertising window 308 can also be coordinated with advertisement tracks being broadcast within the broadcast material. For example, advertising window 308 may advertise other related products, current specials in addition to what is being advertised on the radio, or other information or material that may be pertinent to be keyed with the advertising track. In one embodiment, it is even foreseeable that competitors' ads be placed in advertising window 308 such that competitors can have the chance to also compete in the marketplace. It should be noted however that it is foreseeable that agreements with the advertisers may restrict this practice from occurring. However, the capability exists within the system described herein.

Also provided on player interface 304 is a station list button 318. Station list button 318, when clicked, accesses a list of stations that are accessible by the player. Thus, if the listener wishes to change the station, the listener can click station list 318 and select a new station from among those listed. The list can include identifying information such as, for example, station name, frequency, format, and other information.

As the example described above with reference to FIGS. 5, 6 and 7 illustrates, the provision of supplemental materials coordinated with a stream of broadcast material can provide numerous features and advantages to the user and the providers. Again, it is stressed that the invention is not limited to the specific applications or examples described herein. For example, although the player of FIG. 7 was discussed in terms of the radio station example illustrated in FIGS. 5 and 6, such a player can be used with other architectures, including those architectures illustrated in FIGS. 1–4. Again, broadcast material is not limited to radio broadcast material, but can include other audio, video, or alternative format material.

One or two alternatives are briefly described such that it can be seen how they would fit within the invention described herein. For example, consider a situation where the broadcast material being delivered is television programming. Television programming can be thought of as being formatted similar to the radio broadcast in that it includes tracks of the television program as well as advertising tracks and promotional slots. Similar to the radio example, these tracks in video material can be coded such that supplemental information can be retrieved for the coded tracks. This information can be keyed to and coordinated with the tracks such that the benefit derived from the information is maximized. Information can include information such as the series or program being displayed, actors or actresses associated with the series, perhaps even products that are viewed in camera on the series that a user may wish to investigate more fully.

For example, where the broadcast material is a television show, the actors on a television show may be driving a particular automobile, using a particular brand of coffee, or otherwise using a specific consumer-related product. It is foreseeable then that supplemental information relating to this broadcast material can be coded into the program data such that this supplemental information can be retrieved in conjunction with the viewing of the broadcast material. For example, windows adjacent to the viewing window can provide the user with selections to view supplemental information pertaining to one or more products. Thus, with the click of one of these buttons, the user can obtain this additional information which again can include product specifications, ordering information, shipping and delivery information, as well as a host of other informational items that may be associated with the particular product.

As another example, consider the case in which the broadcast material is a class lecture being delivered by a professor to user equipment 112. The broadcast material may be divided into segments analogous to the tracks, and these segments can have codes associated therewith analogous to the program data. Where this format can also be useful for keying specific supplemental information to specific segments such as, for example, complete solutions to problems being solved in the class, supplemental texts or treatises relating to the subject matter of the segment, homework assignments for the next class, class syllabus or schedule information, and any other informational materials that may be relevant to a segment or class.

As the few examples illustrate, the application of the invention is seemingly limitless in that there are numerous different types of broadcast material and associated supplemental information that can be coordinated in this manner.

Figure 8:
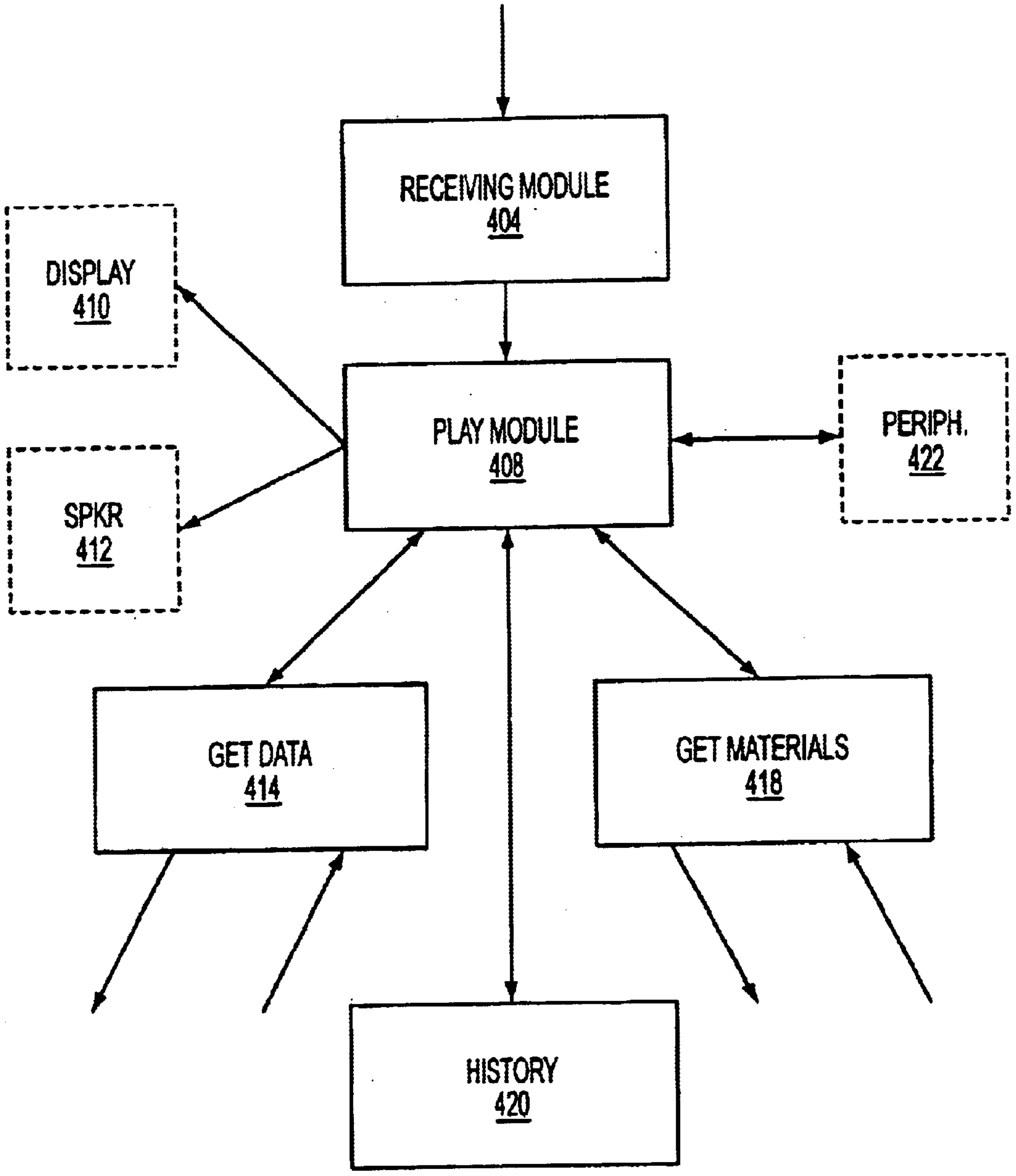
FIG. 8 is a diagram illustrating an example functional architecture for a player according to one embodiment of the invention.

A number of different architectures and configurations can be used to implement a player such as, for example, the player described above. FIG. 8 is a block diagram illustrating the functionality of an example player according to one embodiment of the invention. The player, according to this embodiment, includes several modules for receiving materials, coordinating materials, and playing the materials via the player. These modules are now described according to this example embodiment. After reading this description, it will become apparent to one of ordinary skill in the art how one or more players can be implemented using this or alternative functional architectures. A received broadcast module 404 is configured to receive the broadcast from the broadcast material broadcast provider. As discussed above, in one embodiment, this broadcast is received via the Internet from an Internet broadcast provider.

A play broadcast module 408 is configured to receive the broadcast material from received module 404 and configure the broadcast material for playback via the player. In one embodiment, the broadcast material can be provided to a display screen 410, a speaker 412, as well as other peripheral devices 422. A get-data module 414 can be included to utilize the program data to retrieve information pertaining to the supplemental materials. In one embodiment, as discussed above, this information retrieved is locational or other parameters pertaining to the supplemental data that can provide an indication to the user equipment regarding where to locate the supplemental materials. In alternative embodiments, get-data module 414 can access a server to directly obtain these supplemental materials based on the program data.

A get-materials module 418 can be utilized to use the parameters retrieved by get-data module 414 to subsequently receive the broadcast materials from one or more servers. The get-materials module 418 can provide the retrieved materials to the play broadcast module 408 such that these supplemental materials can be displayed or otherwise played along with the broadcast material on the various peripheral devices.

Also illustrated in FIG. 8 is a history module 420 that can be used to coordinate the archival or storage of particular pieces of information to maintain a history window, as discussed in further detail below. In one embodiment, history module 420 stores the program data received by received module 404 such that this program data can be used to allow the user to go back and retrieve broadcast materials pertaining to a particular segment of the broadcast program. The history module 420 can be used to store program data, as well as, in one embodiment, supplemental materials that may already have been retrieved for a particular program segment.

Figure 9:
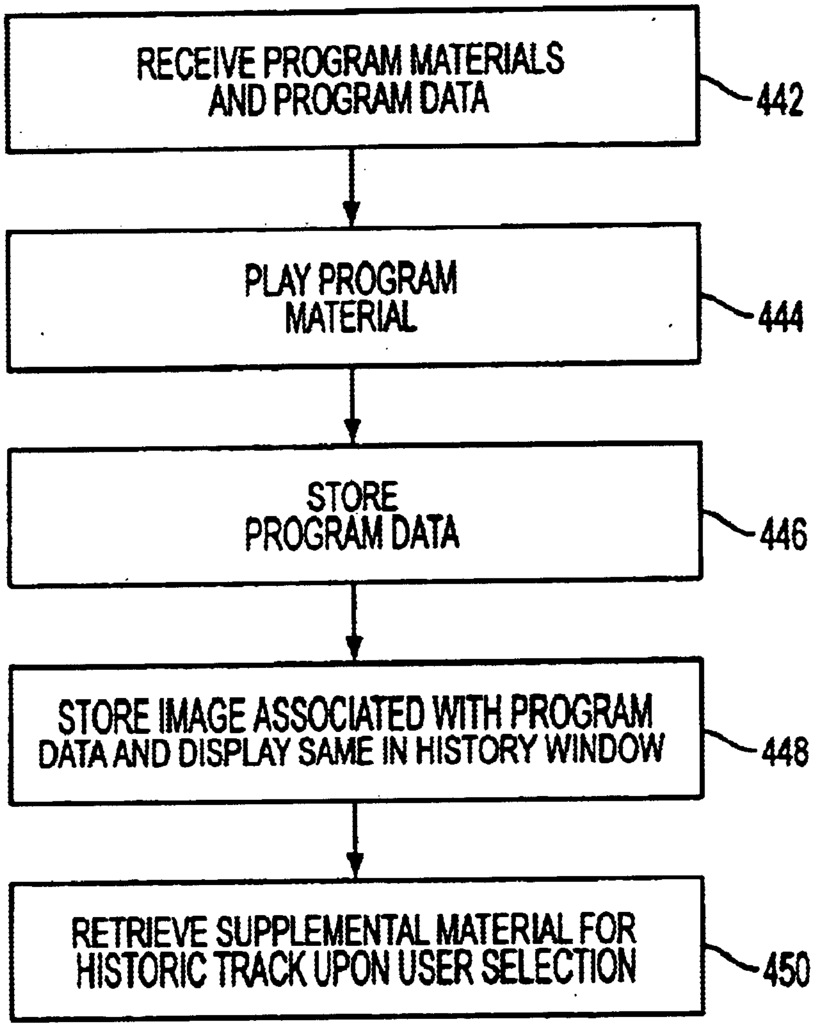
FIG. 9 is an operational flow diagram illustrating a process for implementing a history window according to one embodiment of the invention.

FIG. 9 is a block diagram illustrating one process by which a history window 306 can retrieve information pertaining to the history of the broadcast material. Referring now to FIG. 9, in a step 442, the player receives the broadcast material and program data from a broadcaster. In a step 444, the broadcast material is played to the user while the program data is used to access supplemental information. In a step 446, the program data for each segment is stored in local storage such that it can be recalled by the history window for later use.

Also stored, in a step 448, is an image associated with the program data. This image is displayed as part of the history window. Associated with the displayed image is an identification of the program data or other information that can be used to identify the particular history item. In response to a user selection of a particular item of the history window, the history module retrieves supplemental materials associated with the selected track, and plays these materials to the user. In one embodiment, only the program data is stored for each track, and the history module needs to do a retrieval of supplemental materials associated with that track.

In an alternative embodiment, some or all of the supplemental materials previously retrieved for that track can be stored locally and associated with the item in the history window. In this alternative, these items do not need to be retrieved, and can be more immediately played to the user.

Figure 10:
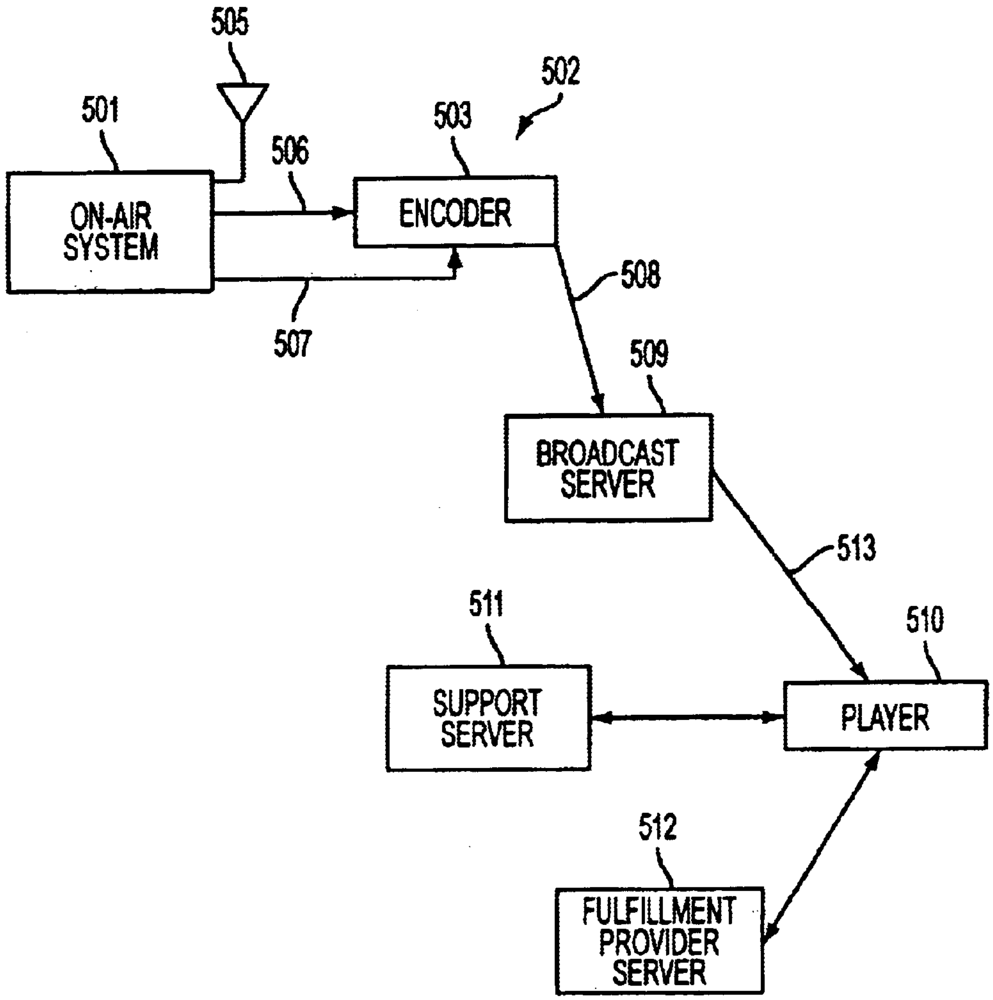
FIG. 10 is a diagram illustrating an example implementation of an architecture for providing supplemental materials with broadcast material.

A more specific example implementation is now described with reference to FIGS. 10–12. As illustrated, in this example, on-air system 501 of the type typically employed by a broadcaster such as a radio station or the like broadcasts a predetermined audio stream comprising a predetermined sequence of songs interspersed with one or more audio advertisements. In one example, the on-air system is a commercially available system such as ENCO or Prophet commonly used by radio stations and the like. The on-air system transmits this audio information over the airwaves through antenna 505, and also provides it in digital form over signal line 506 to encoder 503. Concurrently, the on-air system also provides over signal line 507 data in the form of identifying indicia or codes such as cut codes. The codes are indicators of the audio information concurrently being transmitted over signal line 506. Advantageously, each song or advertisement comprising the audio information being concurrently transmitted over signal line 506 comprises a distinct segment. A cut code corresponding to and uniquely identifying a segment from the standpoint of the radio station is transmitted over signal line 507 concurrently with the transmission of the corresponding segment over signal line 506.

Encoder 503 is configured to compress the audio information received over signal line 506. Advantageously, the encoder can be implemented using a commercially available encoding scheme such as, for example, the "Active Streaming Format" from Microsoft Netshow, or the "SureStream" G2 encoding scheme from Real. Advantageously, the encoder 503 is part of a coordinating encoder 502 configured to merge the cut codes provided over signal line 507 with the audio information provided over signal line 506 to provide a merged data stream over signal line 508. The encoder 503 under the control of the coordinating encoder 502 performs this merging procedure. Advantageously, in this procedure, a cut code is inserted into the merged stream throughout the audio segment it identifies. In one embodiment, Radowave.com, the assignee of the subject application, provides the coordinating encoder 502.

The audio information transmitted from antenna 505 is advantageously received by one or more traditional RF receivers (not shown) configured in the form of radios and the like. This process is known to those of ordinary skill in the art, and need not be described further.

Meanwhile, the merged stream is provided over signal line 508 to one or more broadcast servers 509. In one variant, the transmission of the merged data to the broadcast servers is accomplished through a wireless interface rather than a signal line. Advantageously, in one embodiment, the servers are provided by broadcast.com, of Dallas, Tex., www.broadcast.com and are configured to simply broadcast the merged stream over a communications network such as the Internet.

A player 510 is provided which executes on a client computer or other end use device within the communications network. Alternatively, the player is a web-based player resident on a server in the network, but accessible through the client machine. The player is configured to receive the merged stream over signal line 513 and play the audio component thereof through speakers or the like (not shown) configured as part of the client computer/end user device. In addition, the player is advantageously associated with the radio station or other broadcaster associated with on-air system 501, such that the identity of the radio station or other broadcaster is known to the player.

The player is also configured to detect the presence of a cut code in the merged stream, and responsive to detecting the presence of a cut code identifying a song, signal another server on the network identified with numeral 511. (The response of the player to detecting the presence of a cut code identifying an advertisement is detailed in the next section). In one embodiment, upon detecting a cut code identifying a song, the player is configured to provide server 511 with the identity of radio station 501, as well as the cut code that has been detected.

Advantageously, in one embodiment, server 511 is provided by RadioWave.com, the assignee of the subject application. Responsive to the receipt of a station ID and a cut code identifying a song, the server 511 accesses one or more tables. With reference to FIG. 11, the server 511 first accesses a song table 516, the entries of which correlate a station ID and cut code with an ID of the album containing the song, the name of the artist, the album name, and the song name. Through this step, the server 511 obtains the album ID for the album containing the song associated with the cut code and station ID that was previously sent to the server.

Next, the server 511 accesses a provider table 517. As can be seen, the entries of this table correlate the album ID with (1) a name of an image related to the cut or segment, such as but not limited to a gif image of the cover of the album or tape containing the song; (2) a provider link, i.e., a URL or other link to additional information related to the song or album, such as a link to a server 512 of a fulfillment provider; (3) the artist name; (4) album name; and (5) song name. In one example, by accessing this table, the server 511 obtains the name of an image file of the album or tape cover containing the song, the artist name, the album name, the song name, and the record label. In one implementation, the fulfillment provider server is that of Amazon, Inc. at www.amazon.com and the link to this server is a URL link known as an ASIN#. In one embodiment, server 511 obtains the actual image for the album cover, which is either stored locally or on another server accessible from server 511, and then provides the image, song name, artist name, and album name to player 510. In another embodiment, server 511 provides the player 510 with a link to the image stored on another server, and, responsive to this information, the player 510 obtains the actual image for the album cover, or other related image, from fulfillment provider server 512.

In the event that there is not an entry in the provider table 517 for the album ID obtained from the song table 516, the artist name, album name, and song name are obtained from the song table 516. That is the reason why entries for this information are redundantly provided in both the song table 516 and provider table 517. In this event, song name, artist name, and album name are provided to the player 510, but the provider link is omitted.

Responsive to the receipt of the artist name, album name, song name, image, and provider link (this last item of information being provided only in the case in which there is an entry for the album in the provider table) are then provided to the player 510. Upon receiving this information, the player displays it through a suitable display.

Figure 12:
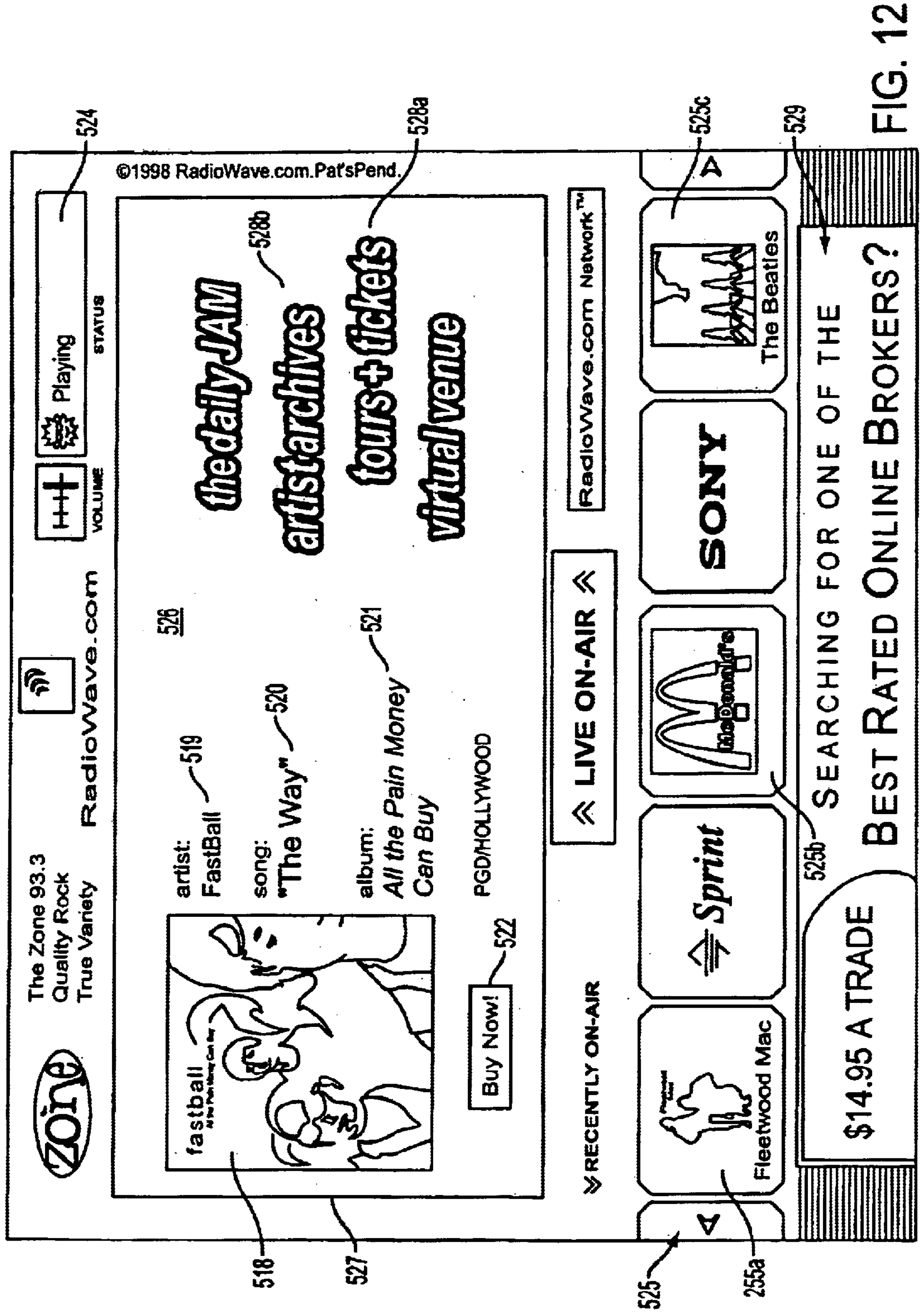
FIG. 12 is a diagram illustrating an example player according to one embodiment of the invention.

With reference to FIG. 12, an example of such a display is illustrated. As can be seen, the display includes a web-based component 526 in which is displayed the image 518 of the album cover for the song that is currently being played, the name 519 of the artist of the song, the name 520 of the song, and the name 521 of the album in which the song is contained. In addition, around the web-based display component is a border 527, which is advantageously stored locally on the client machine. Displayed within or at the border 527 is an identifier 523 for the radio station 501 from which the audio information being broadcast originates, and an indicator 524 of the quality of the signal, and the elapsed listening time.

In one embodiment, a history component 525 is displayed below the web-based component. This component contains information about the audio segments that have been played by the player in the recent past. In the illustrated embodiment, the history information is displayed with the most recent information beginning at the left, and the less recent information being arranged towards the right. As can be seen, the information is displayed is the image associated with the segment. Also, images can be displayed both for songs and advertisements that have aired. Starting from the left, it can be seen that an image 525*a* from a Fleetwood Mac album cover is displayed, indicating that a song from this album was most recently played. This is followed by images for advertisements, which have aired, from Sprint, McDonalds, and Sony. The image for the McDonalds advertisement is identified with numeral 525*b*. Next, image 525*c* for a Beatles album cover is displayed, indicating that a song from this album was played. As audio information is played, this history information is updated.

A "buy now" button 522 is also displayed. When a user clicks on this button 522, with reference to FIG. 10, a link is established to a program resident on fulfillment provider server 512 using the provider link provided by the server 511. As discussed, in one example, the fulfillment provider server 512 is www.amazon.com and the provider link is an ASIN# which is a URL link to this server. Once this link is established, in one embodiment, a browser is launched allowing a user to peruse information resident on server 511 and purchase the album containing the song being played or related albums. Alternatively, the user is allowed access to this information through a feature window displayed by the player. In one example, the link to server 512 is established simply by appending the provider link to the URL of the server 512. In this example, it is assumed that the URL of the server 512 is known to the player 510, but it should be appreciated that examples are possible in which this URL information is provided to player 510 by server 511.

It should be appreciated that examples are possible in which server 511 provides other links associated with the song being played to the player 510. One such example is a URL or other link to information describing the concert tour schedule of the artist of the song being aired, and a program allowing the user to purchase tickets to one of these concerts. With reference to FIG. 512, when a user clicks on a "tours and tickets" identifier 528*a*, the link to this information can be established, and a browser launched or other mechanism such as a feature window initiated allowing the user to peruse this information.

Another example is a URL or other link to information describing other albums by the artist of the song currently being played. Again with reference to FIG. 512, when a user clicks on an "artist archives" identifier 5028*b*, the link to this information can be established, and a browser launched or other mechanism initiated, such as a feature window, allowing the user to peruse this information.

A third example is a URL or other link to information about a product or service being advertised. According to this example, an advertisement regarding a product or service is displayed within web-based component 526. When a user clicks on this information, a URL or other link can be established to a server configured to provide additional information about this product or service, and a browser launched or other mechanism initiated, such as a feature window, to allow a user to peruse this information.

The above specific example is provided by way of example only, and it should be appreciated that other environments are possible allowing beneficial employment of the subject invention, including alternative environments as well as the more generic examples described above.

One challenge facing program directors and general managers responsible for the content of broadcast materials is that of obtaining real-time user feedback to content and content-related decisions. Many contemporary ratings schemes utilize manual entry techniques whereby listeners or viewers are provided with booklets or forms in which they fill in their listening and viewing preferences. Such manual entry is prone to error as there is no way to insure that the forms are being filled out correctly and accurately. Additionally, the long delay time typically associated with processing and publishing such forms does not provide the general manager or program director with real-time or even near-real-time feedback on programming decisions based on audience size or demographics.

As such, the present invention provides a system and method for measuring the behavior of users of broadcast materials. Specifically, according to one embodiment, user tune-in and tune-out events (e.g., log-on and log-off events in a client-server environment) can be recorded and tracked along with the broadcast materials to provide a real-time (ie., immediate or at least relatively quick) indication of user activities in coordination with the content of broadcast materials. Although such a system and method can be implemented in any of a number of architectures or environments whereby broadcast materials are provided to a user, the invention is described in terms of the example environments described above with reference to FIGS. 1–12. More particularly, the invention is described in terms of an example environment whereby broadcast materials are provided to a user via a network and activities of the user with regard to the broadcast materials can be provided to the broadcaster also via a network. In one embodiment, the network is the Internet, although other communications media can be utilized.

Figure 13:
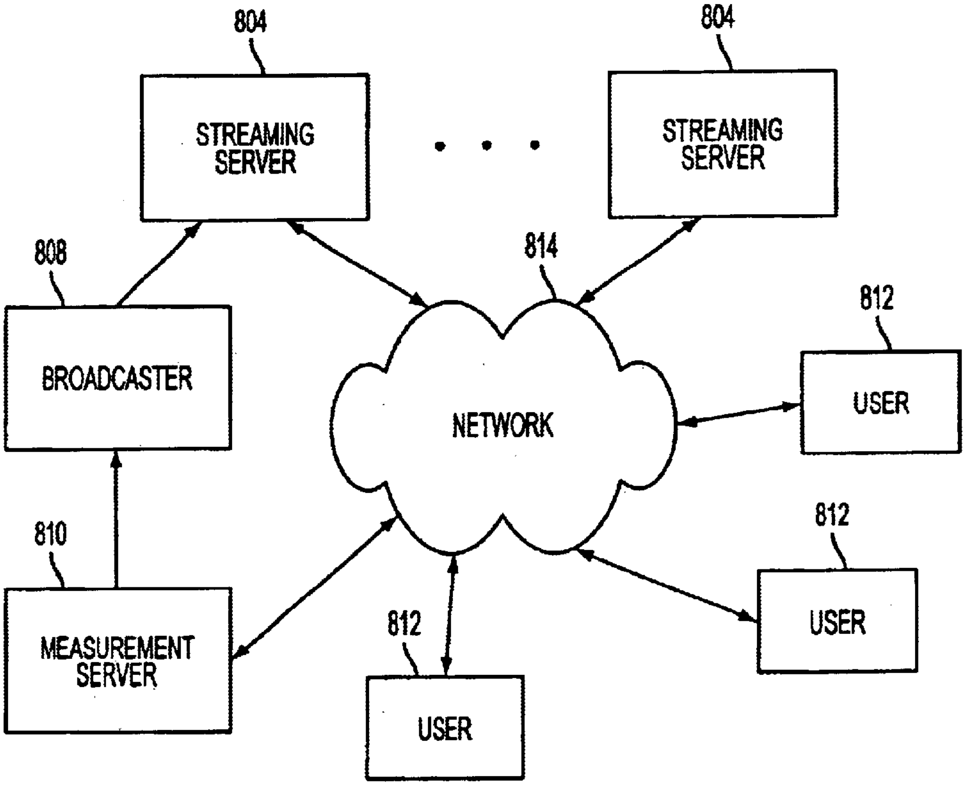
FIG. 13 is a diagram illustrating an example architecture for implementing audience measurement according to one embodiment of the invention.

FIG. 13 is a block diagram illustrating an example architecture for implementing an audience measurement system and method according to one embodiment of the invention. The architecture illustrated in FIG. 13 includes one or more broadcast material servers, such as streaming servers 804, to provide broadcast materials to one or more users 812 via a network 814. As with the environments described above, broadcast materials 806 can include program content as well as program data. In one embodiment, streaming servers can, for example, be implemented as broadcast service providers 208. Network 814 in this embodiment can be implemented using, for example, the Internet 210.

Also included in the architecture of FIG. 13 are one or more measurement servers 810. Measurement server 810 is configured to receive and or access tracking events from a tracking event database and to provide data pertaining to the tracking events back to the one or more broadcasters 808 responsible for the broadcast materials. In one example, measurement server 810 can be implemented using the same data servers used to provide the supplemental information coordinated with the broadcast materials. Alternatively, additional servers can be provided to perform the audience measurement function. Although measurement servers 810 are illustrated as communicating directly with broadcasters 808, this communication can also be via network 814.

In operation, when the user logs on to a streaming server 804 to receive broadcast materials, that log-on event is provided to the measurement server 810. In one embodiment, the log-on event is recorded by a proxy server in a tracking event database, and the tracking event database is accessed by measurement server 810 to retrieve the tracking event. Depending on the architectural configuration, one or more tracking event databases can be located at measurement servers 810, streaming servers 804 at user equipment, or elsewhere on network 814.

The log-on event can be provided with a time stamp or with other information that can be used by the system to help correlate the user events with the current broadcast materials. In embodiments where the broadcast is coordinated with program data as described above, the event can be provided or recorded along with the program data associated with the segment being broadcast at the occurrence of the tracking event.

Additional tracking events such as user log-off events, requests for additional supplemental materials, purchase requests, user tune-out, or other events can be tracked in a similar fashion to log-on events, and provided to or otherwise made available to measurement server 810. As with log-on events, these additional tracking events can be provided or made available with the appropriate information to correlate these events with the content of the broadcast materials. This information can include, for example, a time stamp and program data. Further examples of tracking events are described below.

Additionally, data such as user demographics, user equipment data and other data can be provided to measurement server 810 as well. This data can be provided each time a tracking event is provided. Alternatively, it can be provided initially when a user 'account' is established and maintained at measurement server 810. In this alternative, all that would be needed is a user ID or other identifier to identify the additional information associated with the user's tracking event.

Tracking events can be provided to the broadcasters 808 such that the broadcasters can obtain real-time feedback regarding listener actions in correlation with the content of the broadcast materials. For example, the broadcaster can use the real-time data to determine whether a large number of users have logged off or tuned out their broadcast when a particular track or particular commercial is aired. Thus, the program director can make programming decisions based on this more immediate type of user feedback. Additionally, the broadcasters can obtain historical data to determine the impacts of programming decisions on listenership.

Figure 14:
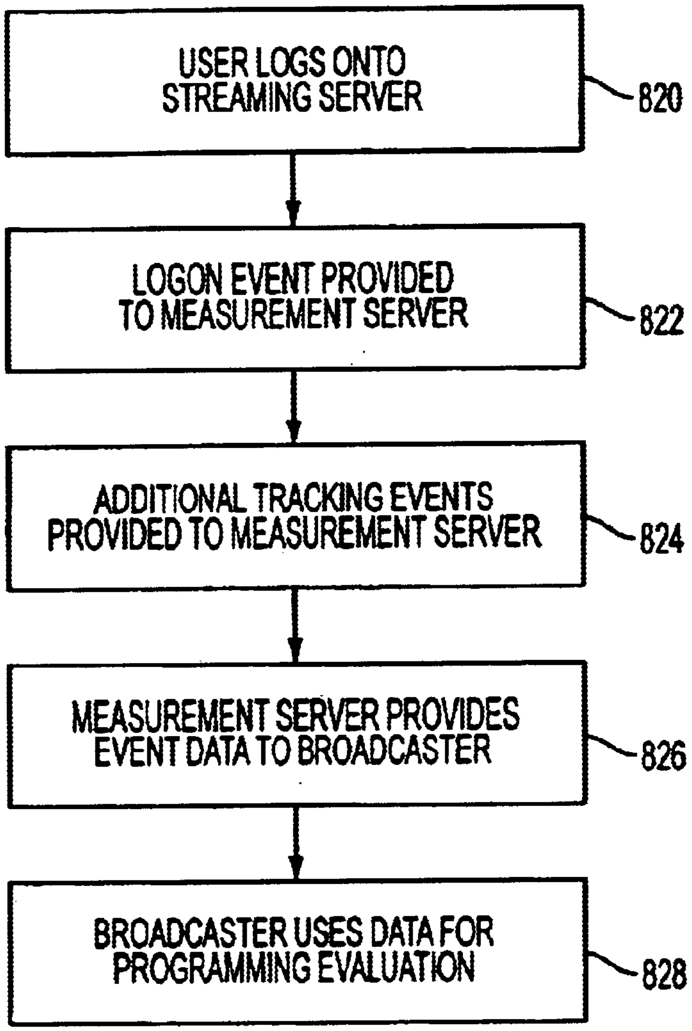
FIG. 14 is an operational flow diagram illustrating a process for audience measurement according to one embodiment of the invention.

FIG. 14 is an operational flow diagram illustrating a process for providing user feedback to a broadcaster according to one embodiment of the invention. In a step 820, a user 812 logs on to a streaming server 804 to receive broadcast materials. Preferably, the user 812 logs on to a particular program or particular set of broadcast materials provided by a streaming server 804. For example, in one embodiment, user 812 logs onto streaming server 804 to receive a particular radio broadcast from a particular station.

In a step 822, this log-on event is provided to or otherwise made available to measurement server 810. In one embodiment, the tracking event is stored in a tracking event database. As stated above, this log-on event can be provided with a time stamp as well as other available data associated with the track or segment currently being broadcast with the broadcast materials.

This log-on event can immediately be provided to the broadcaster 808 responsible for the broadcast materials now being received by user 212. Thus, with the real-time receipt of log-on events, the broadcaster 808 can maintain a real-time measurement of its audience.

In a step 824, additional tracking events from one or more users 812 are provided to or made available to measurement server 810 in the tracking event database. These tracking events can include, for example, an indication of user actions or activities that may be important to broadcaster 808. For example, these tracking events can be log-on or log-off events as well as events such as, for example, the retrieval of any supplemental information, the identification of supplemental information retrieved, an indication of products ordered by a user 812, an indication that the user selected a coupon to be printed or downloaded, and other events.

As with the log-on event, these tracking events can be provided to the measurement server with a time stamp as well as other available data such that the events can be correlated to the content of the broadcast materials. This data can also be provided in real time to the broadcaster 808 such that the broadcaster 808 can have a real-time indication of their listening audience. The provision of this data to broadcaster 808 is illustrated by a step 826.

Also, as stated above, additional information can be included with the tracking events. This additional information can include user demographics and other user information, including his or her listening location and information about his or her listening device.

In one embodiment, proxy software at the front-end of streaming server 804 provides the log-on tracking events to measurement server 810. This software can also provide additional tracking events relating to user interactions with streaming server 804. As stated above, the tracking events can be provided directly to measurement server 810, or to a separate database that can be accessed by measurement server 810. In some embodiments, the software can also provide the program data or other data, where included with the broadcast materials. In some embodiments, a time stamp can be recorded with the tracking events instead of or in addition to the program data or other data. In radio station embodiments, on example of program data can include a cut code, uniquely identifying the broadcast segment.

In alternative embodiments, proxy software can be provided with a player at the user's equipment. This player-based proxy software can be instead of or in addition to the server-based software. In these embodiments, the player-based proxy software 'captures' the tracking events and makes them available to measurement server 810.

As stated, this data can be provided in real time to the program director at the broadcaster facility such that in a step 828 the program director can use this data to evaluate the programming. Alternatively, in a client/server embodiment, the program director can log onto a server such as measurement server 810 to access the real-time and historical data. In an Internet embodiment, the program director may have access to the real-time or historical data via accessing one or more Internet-based servers.

The program director can have access to his or her data in real time, as it comes from the users 812. Additionally, this data can be stored such that historical records can be provided to the broadcaster 808 so that the broadcaster can evaluate the effect of programming decisions after the fact. For example, a broadcaster may look back at the historical records and determine that each time a particular song is played or each time a particular advertisement is played the listenership drops dramatically. As such, it might be reasonable for the program director to conclude that this particular track or segment is detrimental to the broadcaster's ratings. As such, programming decisions can be made to drop this particular segment from the line up.

This historical information can be manipulated and reports provided in textual or graphical form depending on the program director's preference. The data can be stored in a database, such as, for example, a relational database, allowing custom or specific reports to be generated based on the tracking events. For example, the program director can, in this and similar embodiments, select or generate a report showing segments with which a drop-off in the listening audience is associated. Also, the program director can look to see which segments or programs are most popular with the listeners. For example, the program director may generate a report illustrating the peaks in listenership. These peaks may indicate, for example, that listeners tune-in every morning to hear a replay of Jay Leno's monologue and tune-out immediately thereafter. Similarly, the program directors can use this information to perform other evaluations of their broadcast materials.

Figure 15:
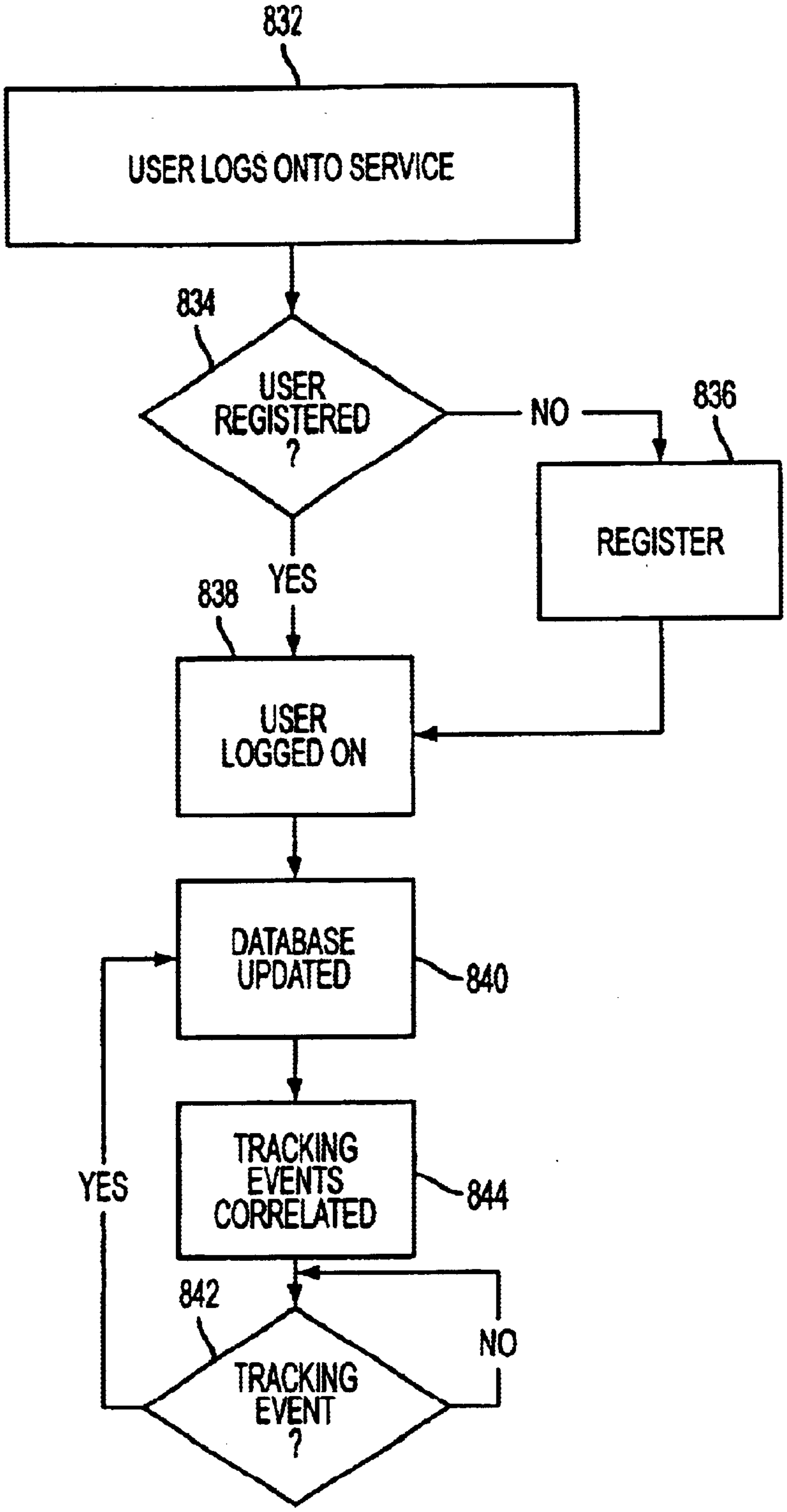
FIG. 15 is an operational flow diagram illustrating user registration according to one embodiment of the invention.

In one embodiment, user demographic information can also be provided with the tracking event data to allow the broadcasters to correlate their listenership data with demographic information. In one application of this embodiment, each user 812 is requested to provide demographic information in a registration process before the user is granted access to the broadcast materials. FIG. 15 is an operational flow diagram illustrating a process for insuring that a user 812 is registered according to one embodiment of the invention.

In a step 832, the user requests access to a streaming server 804 in an attempt to receive broadcast materials. In a step 834, proxy software determines whether the user is a registered user. That is, the proxy software determines whether, for example, the user's demographic information has been made collected and is available to measurement server 810. In one embodiment, this information can be collected and stored in a user profile database (not illustrated). If not, in a step 836 the user is asked to register before being provided access to the broadcast materials. The registration information can include demographic information such as, for example, the user's age, gender, occupation, geographic area, music preferences, and other demographic information that may be of interest to a broadcaster 808.

If the user is not registered, in one embodiment a pop-up registration window or other registration tool is provided to allow the user to complete and submit his or her registration information. If registration information is not completed, in one embodiment the access to the broadcast material is denied. In implementations where Internet is the broadcast medium, well-known Internet registration techniques can be utilized. Other registration techniques can be utilized as well.

Once the user has registered or if the user is already registered, in a step 838 the user is permitted to log-on to streaming server 804. At this point, user 812 receives broadcast materials from streaming server 804.

In a step 840, tracking event database associated with or accessible by measurement server 810 is updated to indicate that a user is now receiving broadcast materials from streaming server 804. As stated above, this information can be maintained for historic purposes as well as provided or made available in real time to broadcaster 808.

In a step 842, tracking events are detected and the tracking event database updated with each tracking event. Because demographic information is available, the tracking events can be correlated with demographic information as well. In a step 844, tracking events are correlated by measurement server 810 with associated demographic information or other information from the user profile database. This can be accomplished using, for example, a commercially available transaction-oriented database such as "Oracle" manufactured by Oracle Corp. in California, USA. As a result, in reviewing the tracking events and the associated program data, broadcaster 808 can determine its ratings or other audience measurement information not only for users in general but for particular users in specific demographic areas.

For example, a program director may wish to determine the listening patterns of all of its female listeners in the San Francisco metropolitan area aged 18–25 who are in the educational field. In this scenario, the program director can apply a "filter" to the data such that the real-time or the historic data only displays or uses in its computations the tracking events for that particular demographic group. This information can be used to provide an indication to the program director regarding the response of one or more groups of listeners to the particular content being broadcast. For example, a program director whose target audience is teenagers of either gender can filter out unwanted data from other groups, and focus only on the listening habits of teenagers in the station's broadcast area. Thus, the program director can more directly focus on its target audience. For example, the program director can use this data to see which programs the teens are tuning into, and which tracks or segments cause them to tune-out the broadcast. Additionally, the program director can track the popularity of particular segments by looking to see which segments cause the listeners to retrieve additional supplemental materials or to purchase items through the player. In this way, the broadcaster 808 can make decisions as to the programming to be provided to best suit its listening audience.

Figure 16:
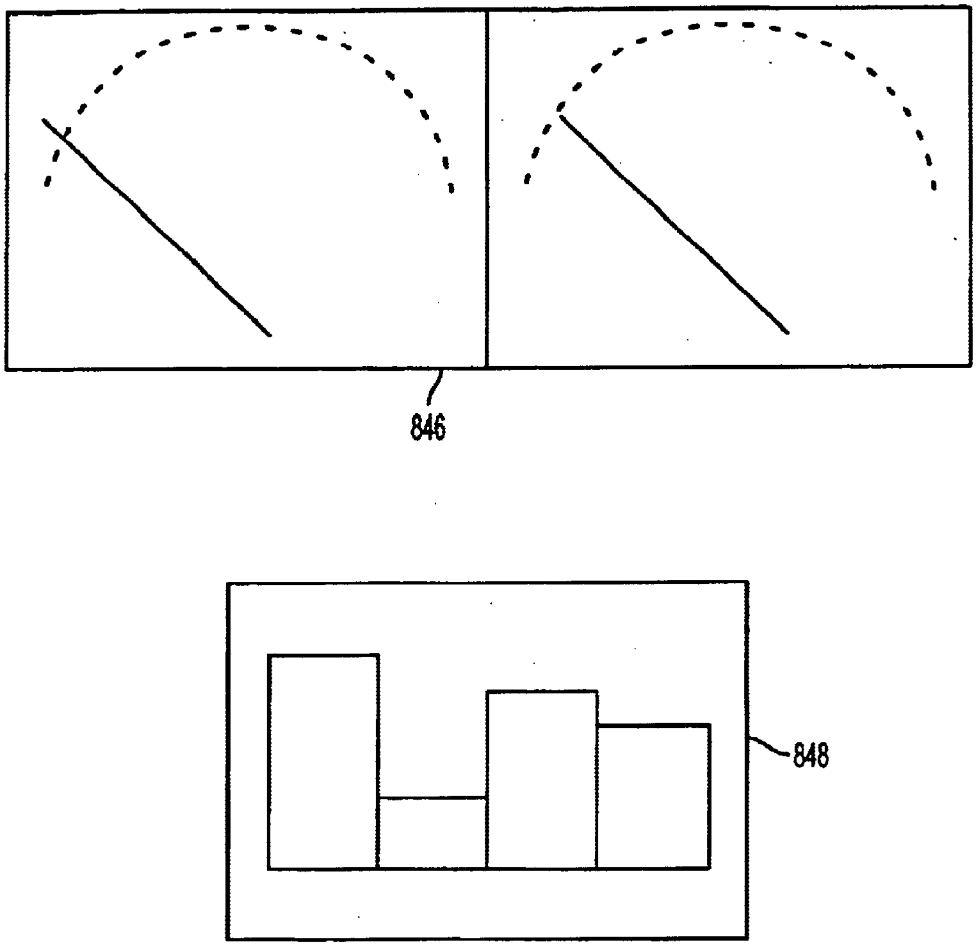
FIG. 16 is a diagram illustrating example audience measurement displays according to one embodiment of the invention.

FIG. 16 is a diagram illustrating example displays that can be provided to a program director to give real-time or historic information or reports about the users currently listening to broadcast materials. For example, display 846 is a meter-type display that can be used to provide an indication of the number of users currently tuned into the broadcast materials. Alternatively, a bar graph or histogram 848 can be provided to reveal an alternative indication of the amount of users currently logged on to the server and receiving broadcast materials. Of course, other display formats can be implemented as well. However, regardless of the display type provided, the displays can be used to show historic or real-time information regarding the users 812. The displays can be "filtered" to display user patterns for one or more particular demographic groups such as, for example, all males, all females, males between the ages of 30 and 40, all male professionals in a particular geographic area, etc. Other filter criteria can be used as well, including for example, day of week, part of day, and so on.

It should be noted that geographic information may be useful in the context where broadcast materials are provided to users 812 via the Internet. This is because the Internet does not have the same geographic limitations that to which a signal transmitted over the conventional airwaves would otherwise be subject. Thus, a broadcaster may be interested in its listening audience in a variety of geographic areas.

One advantage of a display such as histogram 848 is that this type of display more readily allows a side-by-side comparison of data for users of different demographics, or a comparison of other data. For example, in one embodiment the broadcaster can be provided with data indicating industry averages for listenership, or data regarding the listenership of competing stations in a given market. Thus, the program director can determine how well his or her station is doing in the ratings as compared to competitor stations. This information can be provided also in real time on displays such as, for example, those displays illustrated in FIG. 16.

Additionally, histograms can be generated with using time as the variable charted on the horizontal axis. In this embodiment, the program director can view the station's listenership as a function of time. In one embodiment, time can be charted as segments, such that the listenership can be compared from one segment to the next.

In one embodiment, displays such as those illustrated in FIG. 16 can be implemented as graphical representations on a computer screen. This is perhaps the most straightforward implementation of displays as the data is preferably already resident in a computing environment. Additionally, in Internet embodiments, this type of display can be provided to the program director on his or her Internet terminal. However, alternative displays can be implemented as well, including physical meter-type displays driven by a signal generated from the data.

Figure 17:
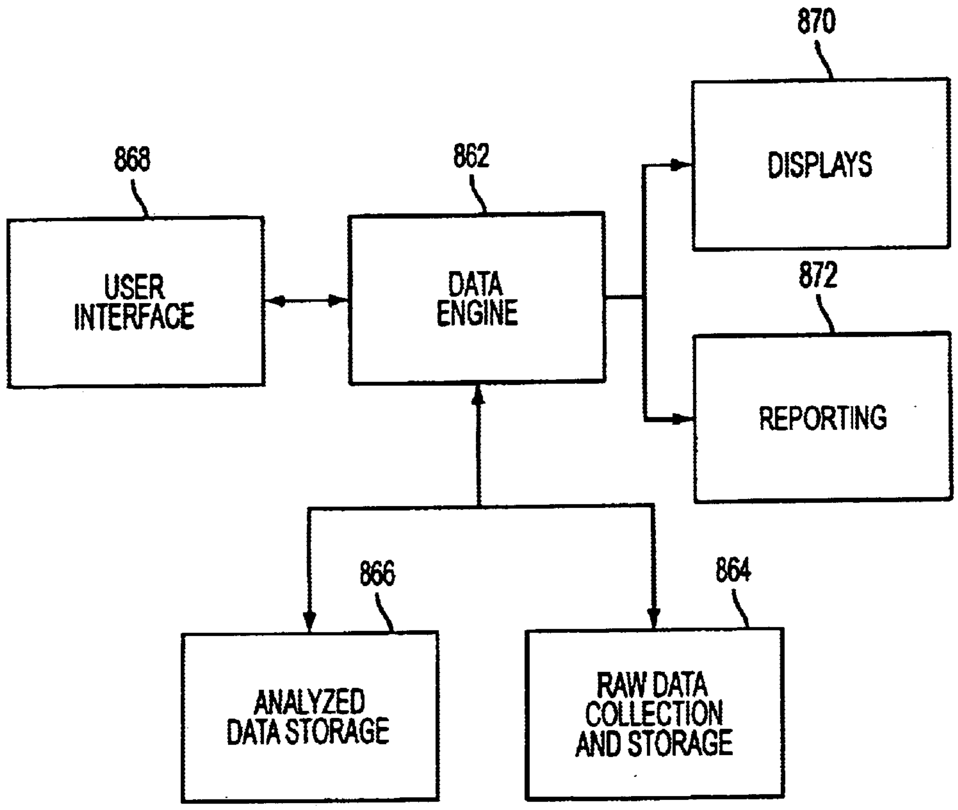
FIG. 17 is a functional block diagram illustrating functionality of an audience measurement system according to one embodiment of the invention.

FIG. 17 is a block diagram illustrating a functional architecture for an audience measurement system according to one embodiment of the invention. Referring now to FIG. 17, at the heart of the audience measurement system is a data engine 862. Data engine 862 is used to perform computations on the collected data such that rating and other information can be provided to the program director. Data storage is illustrated in two blocks, raw data collection and storage 864 and analyzed data storage 866.

Raw data collection and storage 864 can be used to collect and store tracking events, program data, dates and times, user demographics, station IDs, industry averages, and other data collected for use with the audience measurement. Raw data collection and storage 864 can be implemented a measurement server 810 or at a location proximate to the proxy software. In the latter case, the data is made available to measurement server 810.

Analyzed data storage 866 represents the results of computation or analysis or correlation performed on any collected data and stored for archival or historic purposes.

Data engine 862 can use stored data to provide real-time reporting to a program director as well as to create useful reports and displays of real-time, historical or archived information. Data engine 862 can compute averages across various broadcasters. Such averages can be used for normalization of the reported data as well as for comparison of a particular station's data to its competitors or to an industry standard. Normalization may be useful such that changes in the listenership due to factors other than the content can be factored out of the data. For example, the morning drive time is one of the times of peak listenership. As listeners begin to tune-out the stations at the end of the drive time, the station's listenership begins to fall off. As another example, where listeners obtain the broadcast materials via the Internet, they may listen to the programs while at the office. In this scenario, it may be typical for a broadcaster to experience a drop-off in listenership at the close of the business day. Therefore, normalizing the listener data with industry averages or with other comparable data sets can help a program director to better estimate whether users 212 are tuning out because of the content or for other reasons. As with other reports, the program director may choose to filter the normalized data set based on for example, demographics or other information.

A user interface 868 can be provided to allow the program director or other user to manipulate the audience measurement system as well as to receive data from the audience measurement system. For example, the user interface can be used to select the type of data displayed, the demographics for which the data is displayed, to set alarm limits, or other input to allow the program director to obtain the type of information most valuable. Additionally, the user interface can provide audible alerts to the program director for situations such as, for example, sharp drop-offs in listenership. This can be used to attract the program director's attention to the real-time display for pre-programmed events.

The user interface 868 can include, for example, a keyboard, mouse, key pad or other user input device as well as, a display, speaker, or other output device. As described above, displays 870 can also be provided to provide a graphical representation to the program director or other operator. Displays can be for real-time data or for historic or archive data can include, for example, meters, bar graphs, histograms, and other displays or display types. In Internet or other networking embodiments, user interface 868 can comprise HTML, java script or other data and information made available to the program director via the network. Also, in Internet or other networking or client/server embodiments, the user interface 868 can include the program director's terminal and the client/server software or web browser resident thereon.

Additionally, a reporting module 872 can provide reports of real-time or historic data in any of a number of formats, including textual or graphical formats. Reporting can be selected to show particular events and particular demographics or other features such that custom reports can be generated. The reports can be generated as hardcopy reports or on-screen reports. Reports can be graphical, textual or a combination thereof.

Figure 18:
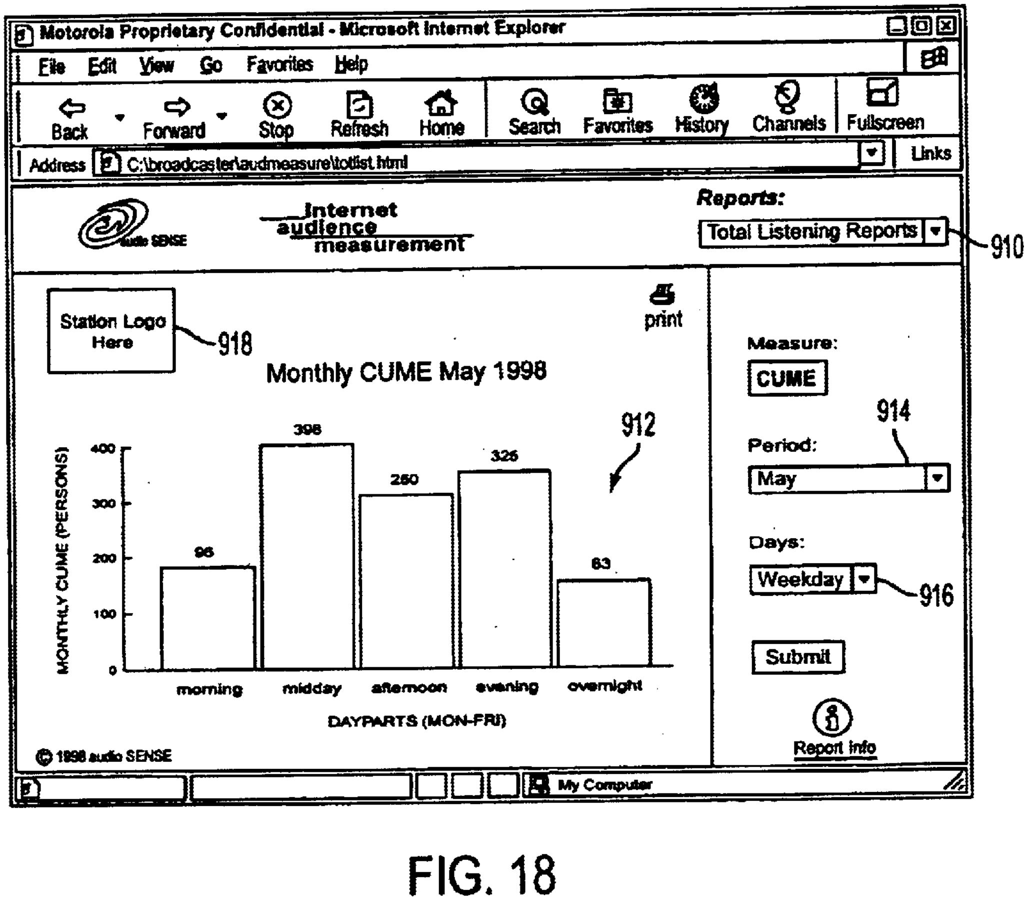
FIG. 18 is a diagram illustrating an example of a CUME report according to one embodiment of the invention.

The functionality illustrated in FIG. 18 can be delegated in whole or in part to broadcaster 808 or may reside in measurement server 810. Of course measurement server 810 can be co-located with broadcaster 808, as can streaming server 804.

In Internet or other client/server embodiments for example, the functionality preferably resides at measurement server 810, and provides data and reports to the program directors via the Internet or other communication interface. In this type of embodiment, the program director logs onto measurement server 810 via a network such as, for example, network 814. In Internet embodiments, the program director simply logs onto a web site where he or she would have access to data on measurement server 810.

In these embodiments, the program director can request real-time or historical reports of audience behavior via his or her terminal by selecting various criteria in any combination. In one embodiment, user name and password protection can be provided such that the data for each particular broadcaster 808 can be maintained in a secure manner. Data encryption can be used to help ensure the security of downloaded data. Other security and privacy techniques can be implemented as well.

In one embodiment, the data available to the program director can include data such as, for example: the size of the listening audience (e.g., CUME, AQH, TSL); format; market or geographic dispersion; demographic information including gender, age, occupation, etc.; time period (e.g., day, month, quarter); day or day type (e.g., day of week, weekday, weekend, or total week); part of day; listening duration and other data. The information can also include any and all of the tracking events, which can include, for example: interactive behavior such as audio volume changes, frequency of visits to the history bar, minimization of the player such that it operates in the background, links to other sites, interactions with advertisers in the feature ad window, ordering of products, retrieval of additional supplemental materials, and so on. Furthermore, additional data can be collected and made available to the program director including information that can be extracted from the users' PC. This information can include, for example, information contained in the client's registry, hardware profile, operating system, PC manufacturer, installed programs, client IP address and games installed.

Thus, with all this information available to the program director, the program director can pick and choose the information that he or she wishes to see, either in real time or in a historic fashion, and in textual or graphical formats. For example, a program director might want to see the audience CUME for his station's format (adult album alternative), in his market (e.g., Dallas), for all women of age 18 to 24 who are professional who listen during the week in the morning. As illustrated above, the interface can show a graphical, tabular or data representation of the particular audience size matching the criteria selected in this example. Additionally, the data can be compared to similarly filtered data sets for competitor stations or for industry averages or other comparable data sets.

As the above description and example illustrate, a large number of different reports can be generated for one or more program directors at one or more stations. Reports can be custom generated each time, or canned reports can be made available with pre-defined criteria. Additionally, program directors can choose to generate and save custom report formats so that they don't have to re-select the items they would like to see in regular reports. Although a large number of reports can be generated, a few examples are provided as further illustration. A total listening report can provide a monthly CUME for a weekday, weekend or total week by the part of the day (for example, morning, midday, afternoon, evening, overnight) for a particular geographic area. CUME is defined as the total number of unique listeners having at least one valid session in a given time period, although other definitions can be selected for CUME. In one embodiment, a valid listening session can be defined as a given time interval, where the total listening is at least a minimum amount of time. In one embodiment, this is defined as a quarter-hour interval with at least five minutes total listening time.

A demographic report, for example, may also be generated and may show the distribution of listener ages for a given gender, time period, part of day, and day type. This report can be provided, for example, in a histogram form such that the distribution of listener ages can be shown for the various time periods. In one embodiment, the histogram can be weighted by listening such that a person who listens for two quarter hours would count twice as much as a person listening for one quarter hour. Other formats for a demographic report can also be chosen.

Additional information can also be provided and can include: whether the listener is inside or outside of a metro area, the listener's location (e.g., work, school, home, other), the listener's occupation (technical, professional, educational, administrative, creative, other) and other information about the listener or his or her environment.

Because the data maintained in the database can be used to perform various calculations, a number of reports can be generated providing useful information to the program directors. These reports can include, for example, conversion reports, retention reports, player usage reports, audience measurement reports, as well as a variety of additional reports. A conversion report, for example, may show the number of users by date who have converted to the Internet listening format (who have successfully used the player) who have returned to using the Internet player, who were profiled (i.e., created a profile on the player), or who are core users (they listen at least a minimum number of times per week for a minimum duration). A retention report can provide an indication of the percentage of core users who have been retained. As stated above, a core user is a user who listens for a minimum amount of times and duration each week. In one embodiment, a core user is defined as a user who listens at least three times per week for a total of at least 24 LINTS in a two week interval preceding the date in question. One LINT is defined as 2.5 listening minutes. Other criteria can be selected to define core users.

As stated above with reference to FIG. 16, several displays can be provided to furnish a graphical representation of listener activity to the program director. In addition, as stated above, in one embodiment the program director can log onto the measurement server to retrieve and view data for his station. Although a number of different formats can be utilized for this viewing, a few examples are now described. FIG. 18 is a diagram illustrating an example of a CUME report for May 1998. The example report illustrated in FIG. 18 is in histogram form and shows the number of persons listening for each of five day parts for the weekdays Monday through Friday. This is illustrated by histogram 912 having a vertical axis of monthly CUME and a horizontal axis of day parts. To facilitate user-friendly operation, pull-down selections, check boxes, radio buttons, or other like user-selection mechanisms can be provided to allow selection of the report type, the period, days, and other factors or attributes that may be desirable to select in generating a report. In the example illustrated in FIG. 18, pull-down lists are provided for the period 914 and for the days 916. In one embodiment, the period can be a month or a quarter and the days can be weekdays, weekend, or total week. Additionally, in the embodiment illustrated in FIG. 18, the report type can be selected by pull-down menu 910. To provide a custom format to the particular station, a station logo can be included on the screen as illustrated by box 918.

Figure 19:
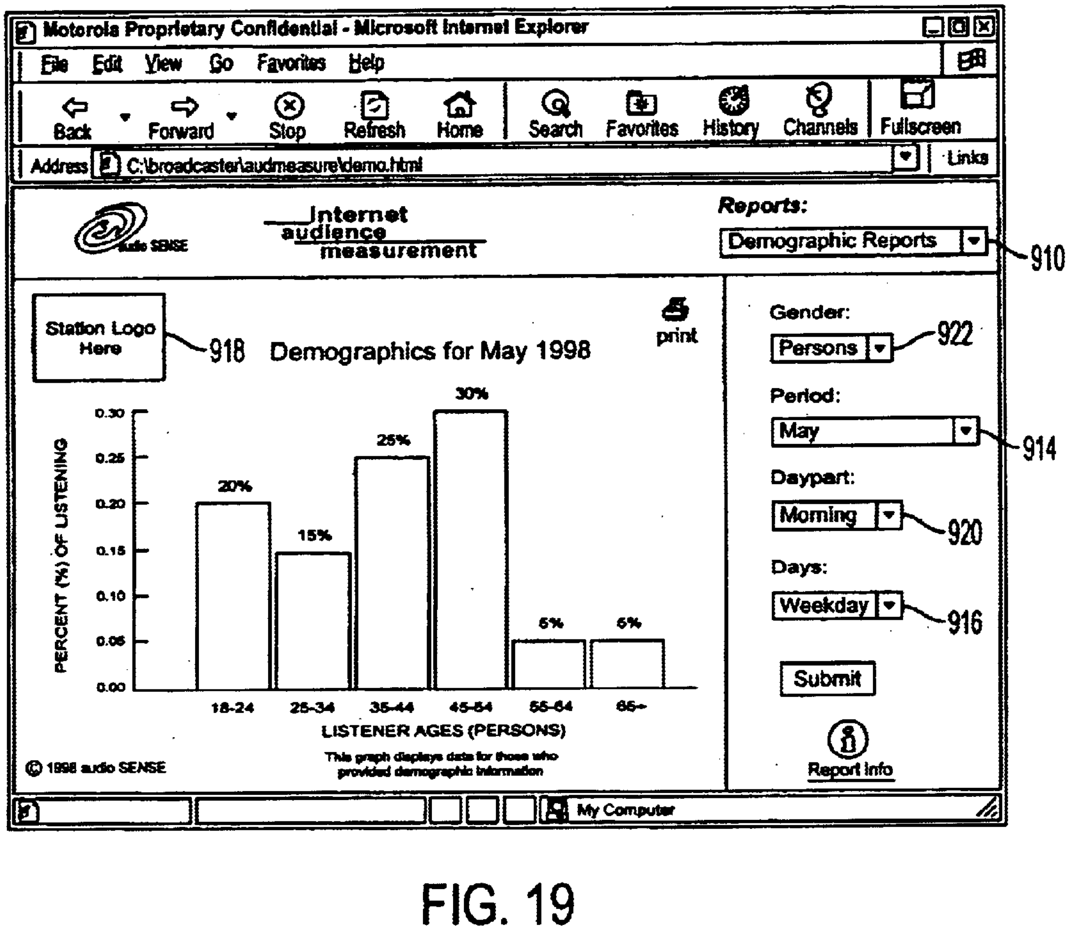
FIG. 19 is a diagram illustrating an example of a demographic report according to one embodiment of the invention.

FIG. 19 is a diagram illustrating an example of a demographic report. In addition to pull-down menus for period 914 and days 916, this example also illustrates a pull-down menu to select the day part 920, as well as gender 922. The example report illustrated in FIG. 19 is a histogram showing the percentage of listeners broken out by listener ages. The gender selected for this report is persons (i.e., both male and female listeners) for the morning day part for weekdays Monday through Friday during the month of May.

As will be apparent to one of ordinary skill in the art after viewing these example reports, a variety of alternative reports and alternative selections can be made to provide additional or alternative information to the program director. In addition to the histogram-type reports illustrated in FIGS. 18 and 19, pie charts or other like graphics can also be included and are useful to show percentage of various components as a part of a whole. For example, a market definition report can be provided that shows the percentage of the listeners that are in the metro area, out of the metro area in a TSA (Total Survey Area), and out of TSA. As an additional example, the percentage of listeners listening at work, home, school or other location can be illustrated in a pie chart as well. Of course, pie chart displays are not limited to this information, but can further be used to show a variety of information that may be selected by a program director.

In addition to pie charts, meters and histograms, another example graphic is line charts. Line charts can be used to provide a graphical representation of data, for example, in a 'strip-chart' format. Such reports are useful to illustrate trends over a given period of time. For example, line graphs graphing the number of users versus the date are useful to show changes in listenership over a given period of time. These, too, can be grouped or selected based on demographics or other information such that a graphical representation can be provided for selected users, groups of users, or user types. Although useful for several types of data, some examples of a line graph report can include conversion reports showing the number of users by date who have successfully converted to using the player, user retention reports showing the percentage of core users retained by the network, and other reports.

As the above examples illustrate, any and all of the data and data types used herein can be combined and selected to provide a graphical or other display of useful information to the program director.

As briefly mentioned above, information about the listenership of other stations can be used to provide additional information to a program director of a given station. In one embodiment, care is taken such that proprietary information of a particular station is not revealed to other stations. However, certain data can be made available to some or all program directors such that they can obtain general information about the listenership of their competition and of the radio market in general. Thus, a program director can request and obtain information pertaining to how his or her station compares with other competing stations or the industry average in CUME, listener duration, listener retention, and other areas. Like the other example reports described above, these reports can be broken down by demographics or other information available in the database and can also be made for specific time periods or day parts. They can also be generated for either historic or real-time data. This is useful to allow a program director to determine the competitiveness of his or her station and its programming.

As a result of the system and method described above, program directors can now make programming decisions on-the-fly, while monitoring their audience in real time. The effects of decisions can be seen almost instantly, and programming decisions can be made without the lag time that was inherent in conventional ratings and measurement type of systems. With the additional information and data computation capabilities provided, the program director can undertake a more detailed analysis of his or her station's performance and determine how programming decisions affect station competitiveness for target audiences and target geographic areas. With this additional information, stations now have the ability to provide listeners with the program materials that they are looking for.

Figure 20:
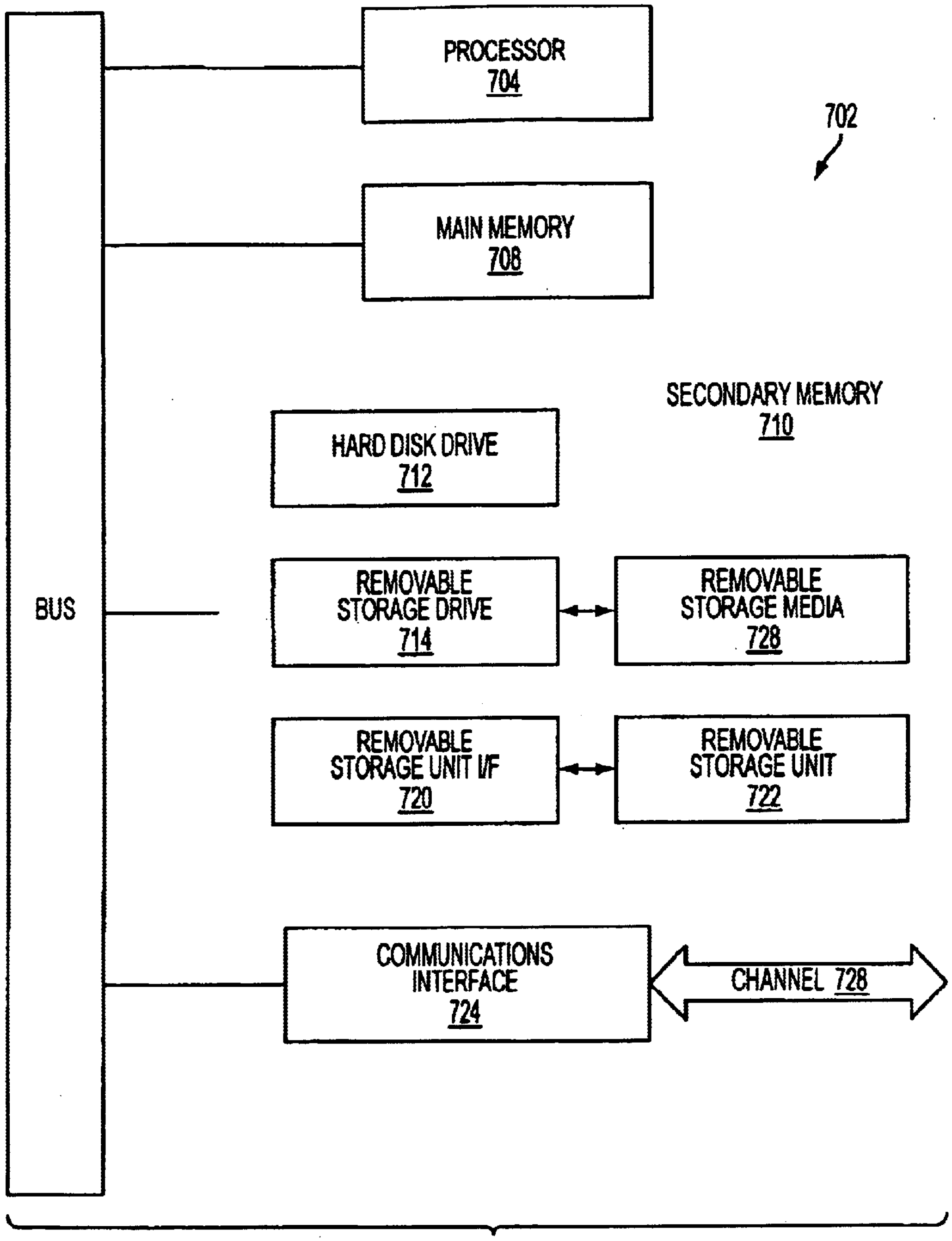
FIG. 20 is a diagram illustrating an example computer architecture according to one embodiment of the invention.

The various embodiments, systems and subsystems of the invention or its environment described above may be implemented using hardware, software or a combination thereof and may be implemented in one or more computer systems or other processing systems. In fact, in one embodiment, these elements are implemented using a computer system capable of carrying out the functionality described with respect thereto. An example computer system 702 is shown in and described with respect to FIG. 20. The computer system 702 illustrated in FIG. 20 includes one or more processors, such as processor 704. The processor 704 is connected to a communication bus 706. Various software embodiments are described in terms of this example computer system. After reading this description, it will become apparent to a person skilled in the relevant art how to implement the invention using other computer or processor systems and/or architectures. The functionality of the invention as described above is not dependent on a particular computer or processor architecture.

Computer system 702 can include a main memory 708, preferably random access memory (RAM), and can also include a secondary memory 710. The secondary memory 710 can include, for example, a hard disk drive 712 and/or a removable storage drive 714, representing a floppy disk drive, a magnetic tape drive, an optical disk drive, etc. The removable storage drive 714 reads from and/or writes to a removable storage medium 718 in a well known manner. Removable storage media 718, represents a floppy disk, magnetic tape, optical disk, etc. which is read by and written to by removable storage drive 714. As will be appreciated, the removable storage media 718 includes a computer usable storage medium having stored therein computer software and/or data.

In alternative embodiments, secondary memory 710 may include other similar means for allowing computer programs or other instructions to be loaded into computer system 702. Such means can include, for example, a removable storage unit 722 and an interface 720. Examples of such can include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 718 to computer system 702.

Computer system 702 can also include a communications interface 724. Communications interface 724 allows software and data to be transferred between computer system 702 and external devices. Examples of communications interface 724 can include a modem, a network interface (such as, for example, an Ethernet card), a communications port, a PCMCIA slot and card, etc. Software and data transferred via communications interface 724 are in the form of signals which can be electronic, electromagnetic, optical or other signals capable of being received by communications interface 724. These signals are provided to communications interface via a channel 728. This channel 728 carries signals and can be implemented using a wireless medium, wire or cable, fiber optics, or other communications medium. Some examples of a channel can include a phone line, a cellular phone link, an RF link, a network interface, and other communications channels.

In this document, the terms "computer program medium" and "computer usable medium" are used to generally refer to media such as removable storage device 718, a disk capable of installation in disk drive 712, and signals on channel 728. These computer program products are means for providing software or program instructions to computer system 702.

Computer programs (also called computer control logic) are stored in main memory and/or secondary memory 710. Computer programs can also be received via communications interface 724. Such computer programs, when executed, enable the computer system 702 to perform the features of the present invention as discussed herein. In particular, the computer programs, when executed, enable the processor 704 to perform the features of the present invention. Accordingly, such computer programs represent controllers of the computer system 702.

In an embodiment where the elements are implemented using software, the software may be stored in, or transmitted via, a computer program product and loaded into computer system 702 using removable storage drive 714, hard drive 712 or communications interface 724. The control logic (software), when executed by the processor 704, causes the processor 704 to perform the functions of the invention as described herein.

In another embodiment, the elements are implemented primarily in hardware using, for example, hardware components such as PALs, application specific integrated circuits (ASICs) or other hardware components. Implementation of a hardware state machine so as to perform the functions described herein will be apparent to persons skilled in the relevant art(s). In yet another embodiment, elements are implemented using a combination of both hardware and software.

While various embodiments of the present invention have been shown and described above, it should be understood that they have been presented by way of example only, and not limitation. It should be apparent to those of ordinary skill in the art that many other embodiments are possible without departing from the spirit and scope of the invention. Thus, the breadth and scope of the present invention should not be limited by any of the above-described exemplary embodiments, but should be defined only in accordance with the claims and their equivalents.

The present application is related to co-pending U. S. patent application Ser. No. 09/163,292, titled "System and Method For Providing Broadcast Material History," now U.S. Pat. No. 6,317,784, 09/163,297, titled "System and Method For Playing Supplemental Materials With Broadcast Material," now abandoned, and No. 09/163,288, titled "System and Method For Coordiating Communications Network Advertising Material," now abandoned, each of which are of common assignee and are incorporated herein by reference in their entirety.

What is claimed is:

1. A system for providing measurement of a listening audience of a radio program broadcast via the Internet, the system comprising:

a radio broadcast system configured to transmit to a streaming server broadcast materials divided into a plurality of program segments, the program segments being accompanied by program data, the program data comprising a code identifying the accompanied program segment;

a streaming server configured to receive the program segments and program data and broadcast the received broadcast materials and program data to a plurality of media players over the Internet;

a media player configured to receive th broadcast materials and data from said streaming server and transmit tracking events for the media player based on the program data; and a measurement sewer configured to receive tracking events for the media players based on the program data and provide an indication to the radio broadcast system of the media players receiving the broadcast materials at a period of time, wherein the indication is based on the program data.

2. The system of claim 1, further comprising proxy software configured to provide said tracking events to said measurement server.

3. The system of claim 1, further comprising proxy software configured to store said tracking events in a database, such that said tracking events can be retrieved by said measurement server.

4. The system of claim 1, wherein said measurement server is further configured to receive program data with said tracking events, said program data indicating which of a plurality of segments is being broadcast at the time.

5. The system of claim 1, wherein said measurement server is further configured to receive time stamps with said tracking events.

6. The system of claim 1, wherein said tracking events comprise an event indicating initiation of streaming to a user terminal and an event indicating termination of streaming to a user terminal.

7. The system of claim 1, wherein said providing an indication is performed in real-time as users log-onto and off of said streaming server.

8. The system of claim 1, further comprising:

a collection engine configured to collect the tracking events indicative of user activities associated with receipt of the program segments a database configured to store said collected tracking events; and a user interface configured to provide reports of said user activities based on the program data to a provider of said broadcast material segments.

9. The system of claim 8, further comprising a data engine configured to process said collected tracking events.

10. The system of claim 8, wherein said collection engine is further configured to collect the program data that is associated with said tracking events.

11. The system of claim 8, wherein said database is further configured to store a time stamp with said tracking events.

12. The system of claim 8, wherein said report comprises a real-time report of users accessing said broadcast material segments.

13. The system of claim 8, wherein said report comprises a historical report of users accessing said broadcast material segments.

14. The system of claim 8, wherein said report comprises a report of listenership of the broadcast material segments.

15. The system of claim 8, further comprising a means for processing said collected tracking events.

16. The system of claim 1, further comprising:

means for collecting the tracking means for storing said collected tracking events; and means for providing reports of said user activities based on the program data to a provider of said broadcast material segments.

17. The system of claim 1, further comprising:

a first graphical display component illustrating real-time listenership for at least one of a plurality of groups of users.

18. The system of claim 1, further comprising:

a graphical display component illustrating listenership for at least one of a plurality of groups of users;

at least one user selection input allowing a program director to select parameters by which said graphical display is to be illustrated.

19. The system of claim 1, wherein providing an indication comprises providing a graphic depiction of listenership.

20. A method of measuring a broadcast material audience, comprising:

transmitting to an Internet broadcasting system, from a radio station system, broadcast materials divided into a plurality of program segments, the program segments being accompanied by program data, the program data comprising a code identifying the accompanied segment;

receiving the program segments and program data at the Internet broadcasting system and broadcasting the received broadcast materials and program data to a plurality of media players over the Internet;

receiving at a media player the broadcast material and program data from said Internet broadcast system;

transmitting at least one tracking event for the media player based on the program data and providing an indication based on the program data to the radio broadcast system of the media players receiving the broadcast materials at a period of time;

receiving said at least one tracking event for the media player storing said at least one tracking event in a database; and providing to a broadcaster the indication based on the program data that said user is receiving said broadcast material from said radio station system.

21. The method of claim 20, further comprising providing reports of listenership data for the broadcaster.

22. The method of claim 20, further comprising receiving additional tracking events indicating user activities, wherein said tracking events include at least one of a user log-on, a user log-off, the ordering of supplemental materials, and a product purchase.

23. The method of claim 22, wherein said additional tracking events are received from the broadcast material segments provider.

24. The method of claim 22, wherein said additional tracking events are received from a user terminal.

25. The method of claim 22, further comprising generating a real-time report of user activities and providing said report to said broadcaster.

26. The of method of claim 25, further comprising filtering the report based on additional data.

27. The method of claim 26, wherein said additional data comprises demographic data.

28. The method of claim 20, further comprising collecting and storing franking events from a plurality of users.

29. The method of claim 20, further comprising collecting demographic information from one or more users.

30. The method of claim 29, further comprising generating reports of user listenership to broadcast material segments based on demographic information.

31. The method of claim 20, further comprising receiving tracking information with said additional tracking events, to enable correlation of said tracking events with the broadcast material segments.

32. The method of claim 20, further comprising receiving time stamps with said additional tracking events, to enable correlation of said tracking events with the broadcast material segments.

33. A computer program product for use with a computer system, said computer program product comprising:

a computer usable medium having computer readable program code means embodied in said medium for causing the computer system collect listenership information, said computer readable program code means comprising:

computer readable program code means for transmitting to an Internet broadcasting system, from a radio station system, broadcast materials divided into a plurality of program segments, the program segments being accompanied by program data, the program data comprising a code identifying the accompanied segment;

computer readable program code means for receiving the program segments and program data at the Internet broadcasting system and broadcasting the received broadcast materials and program data to a plurality of media players over the Internet;

computer readable program code means for receiving at a media player the broadcast material and program data from said Internet broadcast system;

computer readable program code means for transmitting at least one tracking event for the media player based on the program data and providing an indication based on the program data to the radio broadcast system of the media players receiving the broadcast materials at a period of time;

computer readable program code means for receiving said at least one tracking event for the media player;

computer readable program code means for storing said at least one tracking event in a database; and computer readable program code means for providing to a broadcaster the indication based on the program data that said user is receiving said broadcast material from said radio station system.

34. A program storage device, readable by one or more machines, tangibly embodying a program of instructions executable by the machines to perform method steps for audience measurement of broadcast materials, said method steps comprising the steps of:

transmitting to an Internet broadcasting system, from a radio station system, broadcast materials divided into a plurality of program segments, the program segments being accompanied by program data, the program data comprising a code identifying the accompanied segment;

receiving the program segments and program data at the Internet broadcasting system and broadcasting the received broadcast materials and program data to a plurality of media players over the Internet;

receiving at a media player the broadcast material and program data from said Internet broadcast system;

transmitting at least one tracking event for the media player based on the program data and providing an indication based on the program data to the radio broadcast system of the media players receiving the broadcast materials at a period of time;

receiving said at least one tracking event for the media player;

storing said at least one tracking event in a database; and providing to a broadcaster the indication based on the program data that said user is receiving said broadcast material from said radio station system.

* * * * *